(12) United States Patent
Burger et al.

(10) Patent No.: US 12,480,971 B2
(45) Date of Patent: Nov. 25, 2025

(54) MEASURING INSTRUMENT ASSEMBLY COMPRISING A MEASURING INSTRUMENT APPARATUS FOR MEASURING ELECTRICAL MEASUREMENT VARIABLES

(71) Applicant: GMC-I Messtechnik GmbH, Nuremberg (DE)

(72) Inventors: Stefan Burger, Fürth (DE); Eike Christian Weiss, Nuremberg (DE)

(73) Assignee: GMC-I Messtechnik GmbH, Nüremberg (DE)

( * ) Notice: Subject to any disclaimer, the term of this patent is extended or adjusted under 35 U.S.C. 154(b) by 0 days.

(21) Appl. No.: 17/915,084

(22) PCT Filed: Mar. 24, 2021

(86) PCT No.: PCT/EP2021/057583
§ 371 (c)(1),
(2) Date: Sep. 27, 2022

(87) PCT Pub. No.: WO2021/191286
PCT Pub. Date: Sep. 30, 2021

(65) Prior Publication Data
US 2023/0152348 A1    May 18, 2023

(30) Foreign Application Priority Data
Mar. 27, 2020   (DE) .......................... 102020108528.1

(51) Int. Cl.
*G01R 1/04*    (2006.01)
(52) U.S. Cl.
CPC ..................... *G01R 1/04* (2013.01)

(58) Field of Classification Search
CPC .................................. G01R 1/04; G01R 13/00
See application file for complete search history.

(56) References Cited

U.S. PATENT DOCUMENTS

| 4,964,018 A | 10/1990 | Mallory et al. |
| 5,839,633 A | 11/1998 | Fisher |
| 5,850,209 A | 12/1998 | Lemke et al. |
| 6,094,625 A | 7/2000  | Ralston |

(Continued)

FOREIGN PATENT DOCUMENTS

| EP | 1067390     | 1/2001 |
| EP | 1067390 A1 * | 1/2001 | ............... G01R 1/04 |

OTHER PUBLICATIONS

R&S®TSME-Z3 Backpack System for TSME Drive Test Scanner, Rohde & Schwarz GmbH & Co. KG, 2014 (Year: 2014).*

(Continued)

*Primary Examiner* — Daniel R Miller
(74) *Attorney, Agent, or Firm* — Rimon PC

(57) ABSTRACT

Measuring instrument assembly (1) comprising a measuring instrument apparatus (2) for measuring electrical measurement variables, wherein the measuring instrument apparatus (2) comprises a measuring unit (4) comprising measuring electronics (3), and an output unit (5) comprising at least one output means (6), wherein an item of information generated from the measuring unit (4) and/or relating to the measuring unit (4) can be output via the output unit (5), wherein the output unit (5) can be or is detachably connected to the measuring unit (4).

18 Claims, 15 Drawing Sheets

(56) References Cited

U.S. PATENT DOCUMENTS

| | | | |
|---|---|---|---|
| 6,399,888 B1 * | 6/2002 | Chen | H05K 7/142 |
| | | | 411/501 |
| 7,354,304 B2 | 4/2008 | Livingston | |
| D697,708 S * | 1/2014 | Denzer | D3/215 |
| 8,662,362 B1 | 3/2014 | Bastian et al. | |
| 9,505,355 B1 | 11/2016 | Cho | |
| 2003/0137310 A1 * | 7/2003 | Holzel | G01R 13/00 |
| | | | 324/537 |
| 2004/0160410 A1 | 8/2004 | Plathe | |
| 2005/0017080 A1 | 1/2005 | Gold et al. | |
| 2010/0294908 A1 | 11/2010 | Mish et al. | |
| 2011/0074395 A1 | 3/2011 | Marzynski et al. | |
| 2011/0193548 A1 | 8/2011 | Ko | |

OTHER PUBLICATIONS

R&S®TSME Ultracompact Drive Test Scanner User Manual, Rohde & Schwarz GmbH & Co. KG, 2020 (Year: 2020).*

R&S®TSME Ultracompact Drive Test Scanner Product Brochure, Rohde & Schwarz GmbH & Co. KG, 2019 (Year: 2019).*

Rohde & Schwarz: "QualiPoc Freefider III The ultimate portable benchmarker", (2018) URL:http://cdn.rohde-schwarz.com.cn/pws/dl_downloads/dl_common_library/dl_brochures_and_datasheets/pdf_1Freerider_III_3607-1620-12_v0300.pdf (found on Jun. 10, 2021).

* cited by examiner

|     | ME | AE | FE1 | FE2 | FE3 | FE4 | FE5 | FE6 | FE7 | FE8 | FE9 |
| --- | --- | --- | --- | --- | --- | --- | --- | --- | --- | --- | --- |
| ME  | ○ | ✓ | ✓ | ✓ | ✓ | ✓ | ✓ | ✓ | ✓ | ✓ | ✓ |
| AE  | ✓ | ○ | ✓ | ✓ | ✓ | ✓ | ✓ | ✓ | ✓ | ✓ | ✓ |
| FE1 | ✓ | ✓ | ○ | ✓ | ✓ | ✓ | ✓ | ✓ | ✓ | ✓ | ✓ |
| FE2 | ✓ | ✓ | ✓ | ○ | ✓ | ✓ | ✓ | ✓ | ✓ | ✓ | ✓ |
| FE3 | ✓ | ✓ | ✓ | ✓ | ○ | ✓ | ✓ | ✓ | ✓ | ✓ | ✓ |
| FE4 | ✓ | ✓ | ✓ | ✓ | ✓ | ○ | ✓ | ✓ | ✓ | ✓ | ✓ |
| FE5 | ✓ | ✓ | ✓ | ✓ | ✓ | ✓ | ○ | ✓ | ✓ | ✓ | ✓ |
| FE6 | ✓ | ✓ | ✓ | ✓ | ✓ | ✓ | ✓ | ○ | ✓ | ✓ | ✓ |
| FE7 | ✓ | ✓ | ✓ | ✓ | ✓ | ✓ | ✓ | ✓ | ○ | ✓ | ✓ |
| FE8 | ✓ | ✓ | ✓ | ✓ | ✓ | ✓ | ✓ | ✓ | ✓ | ○ | ✓ |
| FE9 | ✓ | ✓ | ✓ | ✓ | ✓ | ✓ | ✓ | ✓ | ✓ | ✓ | ○ |

Fig. 24

|     | ME | AE | FE1 | FE2 | FE3 | FE4 | FE5 | FE6 | FE7 | FE8 | FE9 |
| --- | --- | --- | --- | --- | --- | --- | --- | --- | --- | --- | --- |
| ME  | ○ | ✓ | ✓ | ✓ | ✓ | ✗ | ✓ | ✓ | ✗ | ✓ | ✓ |
| AE  | ✓ | ○ | ✓ | ✗ | ✗ | ✗ | ✓ | ✓ | ✓ | ✗ | ✗ |
| FE1 | ✓ | ✓ | ○ | ✓ | ✗ | ✗ | ✓ | ✓ | ✓ | ✗ | ✓ |
| FE2 | ✓ | ✗ | ✓ | ○ | ✗ | ✓ | ✓ | ✓ | ✓ | ✗ | ✗ |
| FE3 | ✓ | ✗ | ✗ | ✗ | ○ | ✗ | ✗ | ✗ | ✗ | ✗ | ✗ |
| FE4 | ✗ | ✗ | ✗ | ✓ | ✗ | ○ | ✓ | ✗ | ✗ | ✓ | ✗ |
| FE5 | ✓ | ✓ | ✓ | ✓ | ✗ | ✓ | ○ | ✓ | ✗ | ✗ | ✓ |
| FE6 | ✓ | ✓ | ✓ | ✓ | ✗ | ✗ | ✓ | ○ | ✗ | ✗ | ✓ |
| FE7 | ✗ | ✓ | ✓ | ✓ | ✗ | ✗ | ✗ | ✗ | ○ | ✗ | ✓ |
| FE8 | ✓ | ✗ | ✗ | ✗ | ✗ | ✓ | ✗ | ✗ | ✗ | ○ | ✗ |
| FE9 | ✓ | ✗ | ✓ | ✗ | ✗ | ✗ | ✓ | ✓ | ✓ | ✗ | ○ |

Fig. 25

MEASURING INSTRUMENT ASSEMBLY COMPRISING A MEASURING INSTRUMENT APPARATUS FOR MEASURING ELECTRICAL MEASUREMENT VARIABLES

CROSS-REFERENCE TO RELATED APPLICATIONS

This application is the national phase entry of PCT application PCT/EP/2021057583, filed Mar. 24, 2021, which claims the benefit of priority of German application No. 10 2020 108 528.1, filed on Mar. 27, 2020, entitled "MEASURING INSTRUMENT ASSEMBLY COMPRISING A MEASURING INSTRUMENT APPARATUS FOR MEASURING ELECTRICAL MEASUREMENT VARIABLES." Each of the above applications is incorporated by reference as if fully set forth herein.

INCORPORATION BY REFERENCE

All publications and patent applications mentioned in this specification are herein incorporated by reference in their entirety to the same extent as if each individual publication or patent application was specifically and individually indicated to be incorporated by reference.

SUMMARY OF THE DISCLOSURE

The invention relates to a measuring instrument assembly comprising a measuring instrument apparatus for measuring electrical measurement variables, wherein the measuring instrument apparatus comprises a measuring unit comprising measuring electronics, and an output unit comprising at least one output means, wherein an item of information generated from the measuring unit and/or relating to the measuring unit can be output via the output unit. The measuring instrument assembly can be used for measuring electrical current, voltages and/or resistances.

Corresponding measuring instrument assemblies are known in principle from the prior art and are referred to as multimeters. In particular digital multimeters are currently widely used. A disadvantage of the measuring instrument assemblies known in the prior art is that the measuring electronics and any output means are inseparably interconnected in a common housing. Thus, the measuring electronics is also always present at the site where a measurement result is output or read out.

The object of the invention is that of specifying a measuring instrument assembly which in particular allows for simple and comfortable handling, as well as quick performance of measuring tasks which are to be carried out at different sites.

The object is achieved by a measuring instrument assembly according to claim 1. The claims dependent thereon relate to possible embodiments of the measuring instrument assembly.

The invention relates to a measuring instrument assembly comprising a measuring instrument apparatus for measuring electrical measurement variables, wherein the measuring instrument apparatus comprises a measuring unit comprising measuring electronics, and an output unit comprising at least one output means, wherein an item of information generated from the measuring unit and/or relating to the measuring unit can be output via the output unit. The measuring instrument assembly is characterized in that the output unit can be or is detachably connected to the measuring unit. The fact that the output unit, e.g. a housing body provided with at least one display means, such as a display, can be separated or removed from the measuring unit makes it possible to arrange the output unit at a first site, while the measuring unit can be moved to a (further) site intended for the measurement to be performed by the measuring instrument apparatus. The detachable connection relates to a mechanical or magnetic connection between the measuring unit and the output unit, which can be reversed at least temporarily. Thus, the output unit or the operating device can be used independently, in order, for example, to carry out an inventory, at a first site, of at least one test location, in particular all test locations of a test assignment, using the output unit, in particular using an input means of the output unit.

It is possible for the detachable connection of the measuring unit and the output unit to be used for a modular construction of the measuring instrument assembly. It is thus possible to selectively connect a measuring unit to two different output units, and/or one output unit to two different measuring units. It is furthermore possible to use the mechanical connection interface of the measuring unit for the selective or modular attachment of an output unit and optionally further functional units.

The measuring unit and the output unit can be connected via a data link for exchanging information. In this case, the data link can be designed so as to be wired and/or wireless. In particular, a wireless connection of the output unit and measuring unit allows for comfortable and at the same time flexible use of the measuring instrument assembly. A wireless data link can be designed for example as a radio link, preferably as a short-range radio link, particularly preferably as a Bluetooth radio link. Furthermore, the data connection of the measuring unit to the output unit can be formed at least in part, in particular completely, as a unidirectional or as a bidirectional data link.

In addition or alternatively to a display means that outputs visually perceptible information (e.g. display), the output unit can comprise at least one means which can output a tactile (e.g. vibrations) and/or an acoustic (audio) signal.

By means of the measuring instrument assembly described herein, for example measurements can be made which are consulted for determining electrical currents, voltages and/or resistances, and/or other physical variables to be associated with the field of electrical engineering and/or electronics.

The measuring electronics arranged in the measuring unit serves for the actual determination or for evaluation of the test currents taken off via a testing instrument at a test circuit or test object. The testing instrument can be for example a test probe which is connected via a cable to at least one interface provided for this on the measuring unit, in order in particular to transmit a measuring current into the measuring electronics.

The measuring unit and the output unit can be mechanically and/or magnetically interconnected or assembled in a first state (connected state), and can be provided in a manner spatially separated from one another in a second state (detached state). In the connected or assembled state, a hinge means can be arranged or formed on the measuring unit and/or on the output unit, which hinge means makes it possible to change a relative position and/or orientation of the output unit and measuring unit, without separation of the measuring unit and output unit being performed. The change in the relative position and/or orientation can comprise a change, which is linear and/or rotational at least in portions, in a starting position and/or orientation with respect to a changed position and/or orientation.

In the connected or assembled state, a data link between the output unit and measuring unit can be achieved by means of electrical contacts (i.e. a wired manner or in a manner connected via conducting tracks).

In the connected state or in the assembled state, the measuring unit and output unit can form a rigid unit. This can mean for example that the measuring unit and the output unit do not perform any relative movement with respect to one another on account of at least one action of gravity (also in the case of the measuring instrument assembly falling). In this case, any latching movements or movements brought about by a defined manual force introduction, between the measuring unit and the output unit can nonetheless constitute a rigid unit of the measuring unit and output unit. This is because a prevention of movement (rigidity) of the relative movement is present until the latching resistance is overcome.

It is possible for the output unit to comprise at least one input means, wherein a control signal acting on the measuring unit, and/or an item of information that can be associated with a measured value that is determined and/or is to be determined via the measuring unit, and/or an item of information that modifies a measured value determined via the measuring unit, can be input via the input means. It is possible for a person to intervene in the measuring process itself, and/or in archiving of the measurement and/or of the determined measured value, and/or in an interpretation of the measurement or of the determined measured value via the input means. For example, information relating to the site of the measurement, e.g. a particular socket, which is to be checked or is checked via the measuring instrument assembly, can be transmitted to the measuring unit via the input means. In particular, it is possible for an inventory, which can in particular be carried out on-site, of at least one test location, in particular all the test locations of a test assignment, to be carried out via the input means of the output unit. For example, the operator can erect or arrange the measuring unit at a first location, and guide the output unit, transported into the respective rooms of the building, to the objects to be measured, e.g. sockets and securing means, in particular inside a building. For example, if the objects to be measured are arranged or formed in different buildings and/or floors and/or rooms and/or portions of a room, wherein said respective items of identification or location information of objects to be measured can in each case be input in the vicinity of said object, via the input means of the output unit of the measuring instrument assembly, this procedure can be referred to, for example, as an inventory of the objects to be measured. In a following step, the actual measurements can then be carried out by the same person or a different person, by means of the measuring unit said person carries with them.

Alternatively or in addition, a control signal for changing the measuring mode and/or the measuring unit and or the measuring range can be transmitted to the measuring unit via the input means, and a corresponding change of the measuring electronics can be carried out.

It can be provided for a memory to be provided in the output unit and/or in the measuring unit and/or in a device arranged outside of the output unit and measuring unit, in which memory information resulting from the measurements, in particular measured values, can be stored. In this case, it can be provided for additional information to be assigned to a measured value, and for said assignment information and/or the assigned information to also be stored in the memory. This supplementary information can be input for example via an input means, in particular on the output unit side, associated with an item of information resulting from a measurement, and stored in the memory. Alternatively or in addition, an item of information stored in the memory can be output via the output unit. A change in the information stored in the memory, in particular an assignment of individual information components to individual measurements, can be performed using the input means.

It is possible for the measuring instrument assembly to comprise a carrying device which can be carried by a person, wherein the measuring unit can be or is connected indirectly or directly, in or on the carrying device. In other words, the carrying device can be connected to the measuring unit in a force-fitting and/or form-fitting manner. For this purpose, the carrying device and the measuring unit can comprise corresponding connecting means, which allows for a rigid connection of the measuring unit and at least one component of the carrying device. In particular, the measuring unit and the carrying device are interconnected such that, when, in carrying use, as intended, of the measuring unit, no relative movement of the measuring unit with respect to the carrying device can be performed by means of the carrying device. Providing a locking means, in particular a snap/latching connection, makes it possible to prevent unintended removal or detachment of the measuring unit from or out of the carrying device, and to allow for simple handling.

A measuring unit which can be indirectly detachably fastened in or on the carrying device can be arranged for example at least in portions, in particular completely, in a receiving body, and can be fixed, together with the receiving body, in or on the receiving region on the carrying device side. For example, the receiving body is designed as an openable container, in the interior of which the measuring unit can be inserted or received. In other words, the measuring device can be received in at least one receiving body that comprises at least one receiving chamber. In particular, the receiving body can be detachably connected or is detachably connected, or can be detachably fastened or is detachably fastened, in or on the carrying device, preferably by means of being received in a receiving region on the carrying device side.

In a preferred embodiment, the measuring unit is or can be received in a first receiving chamber of the receiving body, and the output unit is or can be received in a second further receiving chamber of the receiving body, which can be separated from the first receiving chamber, at least temporarily, by a partition wall. In this case, it is optionally possible for the partition wall to comprise an aperture, which forms a connection between the first and the second receiving chamber. For example a cable, in particular a connecting cable, can extend between the first and second receiving chamber, through the aperture.

For example, the receiving body is designed such that a measuring unit received in the first receiving chamber can be or is surrounded by the receiving body. Alternatively or in addition, the measuring unit received in the receiving chamber of the receiving body can be surrounded on all sides by wall portions of the receiving body. In the closed state of the receiving body, the wall portions of the receiving body preferably comprise only cable passages, in order to guide a cable, connected to a device (e.g. measuring unit and/or output unit) located in the interior of the receiving body, towards the outside of the receiving body.

In the state when inserted in the receiving body, the measuring unit can be surrounded at least in portions, in particular entirely, by wall portions of the receiving body. For example, the receiving body is designed as a case into which the measuring unit can be inserted. The receiving body can preferably comprise an opening or an aperture, through which at least one operating element (e.g. a button) on the measuring unit side can be operated, and/or through which at least one cable that is attached or connected on the measuring device side can be guided. Thus, even in the state when the measuring unit is received in the receiving body, a cable connected to the measuring unit can be guided to the outside of the receiving body, in order for example to transmit a measuring current from outside the receiving body to the measuring unit received in the receiving body. The receiving body can also comprise means for being carried directly by a person, e.g. a waist or shoulder strap.

The carrying device can also, for example in the state when the measuring unit is inserted in or fixed on the carrying device, form a rigid unit together with said measuring unit or the receiving body that receives the measuring unit. That is to say, for example, that the measuring unit and/or a receiving body that receives the measuring unit forms a rigid (mechanical and/or magnetic) and detachable connection to at least one component of the carrying device.

The carrying device can for example be designed or configured such that the measuring unit can be carried in the region of a back of a person, via the carrying device. This makes it possible for the measuring unit to be carried by a person, on their back, such that as a result the unit having the highest weight within the measuring instrument assembly is placed at a comfortable carrying site, while a testing instrument and/or an output unit can be placed at a site which is easy for the person carrying the carrying device and/or another person to see and/or grasp or operate, in particular can be held in a hand.

The carrying device can for example comprise a receiving region which is defined at least in portions, in particular completely, by a wall portion and is intended for receiving the measuring unit and/or a receiving body that receives the measuring unit. The wall portion can for example serve as a stop or movement limiter and/or as a centering aid, at least during the insertion of the measuring unit or of the receiving body into the receiving region. The measuring unit or the receiving body is preferably surrounded in a U-shaped or O-shaped manner by at least one wall portion on the carrying device side, such that an at least temporary contact with the measuring unit or the receiving body can take place on the inner surfaces of said at least one wall portion, and a guide and/or centering function can be performed by means of said contact.

During introduction into the receiving region, the measuring unit and/or the receiving body can perform a movement, relative to the receiving region of the carrying device, which is linear at least in portions, in particular completely, and/or rotational at least in portions, in particular completely.

The carrying device can for example comprise a receiving means, the spatial/physical shape of which is defined by walls or wall portions. The receiving means can be designed in one piece or in multiple parts; in a multi-part embodiment, the receiving means comprises a plurality of receiving means segments, which can be or are interconnected so as to form the receiving means. Irrespective of the one-piece or multi-part embodiment, the receiving means comprises a receiving region; this is typically an inner receiving means volume which is delimited by corresponding walls or wall portions of the receiving means. The receiving region serves in functional terms, at least in portions, as a receiving chamber for indirectly or directly receiving the measuring unit, and thus also for receiving a receiving body which can receive the measuring unit. The wall portions can surround the receiving region in a pot-like manner, i.e. for example a base region is formed by wall portions that surround the receiving region, at the periphery, at least in portions, in particular completely.

It is possible for the carrying device to for example comprise a carrying system which comprises at least one shoulder element which can rest on or rests on at least one shoulder of a person carrying the carrying device, in particular the at least one shoulder element is designed as a shoulder strap. In this case, the carrying device can for example comprise a carrying system having two shoulder elements, which is carried like a rucksack, having one shoulder element, in each case, resting over one shoulder of a person.

The use of a shoulder element designed as a shoulder strap can be characterized by a property of the shoulder strap or the material thereof that is rigid, at least in portions, i.e. a non-limp behavior of the shoulder strap. In other words, in this case the shoulder strap means not a belt-like band, but rather a rigid or only slightly resilient element. It is thus possible that the shoulder element, formed as a shoulder strap, does not constitute a belt-like member, but rather a largely rigid element or strap. A shoulder strap of this kind makes it possible, when the carrying device is used as intended, for said carrying device to be carried by laying a rigid or non-limp element on at least one shoulder part of the person carrying the carrying device. In this case, the shoulder strap can, for example as an unsupported or resting element, support the weight force of the carrying device and any elements fastened on the carrying device, with respect to at least the shoulders of the person carrying the carrying device, without, or substantially without, bending of the shoulder element. The shoulder strap is preferably provided, at least on the contact surface thereof for contact with the person carrying the shoulder strap, with cushioning.

A shoulder element designed as an unsupported shoulder strap can be arranged or formed, on one end side, on a receiving means that forms a receiving region for the measuring unit, and can comprise a free end at the other end. This design of the at least one shoulder element, of the shoulder strap, of the carrying system of the carrying device, which forms a non-closed ring or does not form a closed ring, allows for the carrying device to be put on and taken off in a quick and comfortable manner since at least one arm does not have to be threaded in or out through a shoulder element loop.

The shoulder strap can for example be U-shaped, wherein, in the state in which the carrying device is being carried, an open region of the U-shape faces in a direction that is directed forwards and/or downwards and/or backwards, proceeding from a person carrying the carrying device.

Alternatively or in addition it may be provided for the measuring instrument assembly to comprise a carrying means that can be carried by a person, wherein the display unit can be connected in or on the carrying means. In this case, the carrying means can for example be designed or configured such that the output unit can be carried, via the carrying means, on a hand region and/or an arm region of a person. This makes it possible for a person carrying the carrying means to be able to easily and comfortable perceive the output unit or a signal output by the output unit. In particular, for example a visual and/or acoustic and/or haptic signal, which signal is output by the output unit, can be perceived by the person carrying the carrying means. For example, the output unit comprises a display which can be easily read by the person carrying the carrying means, since, by way of the carrying means, the display is placed in the region of the wrist and/or of the hand and/or of the arm.

In an alternative embodiment, the carrying means can be designed as a carrying means that can be arranged or fixed around the upper body, in particular the carrying means can be arranged or fixed around the upper body of a person such that at least one output unit, fastened to the carrying means, can be viewed and/or operated by said person. It is thus possible for the output unit to be held by the carrying means, on an upper body of a person, in such a way that the output unit is placed, in particular centrally, below the head. Preferably, the output unit is held, when used as intended, in the region above the hips and below the neck of said person. Particularly preferably, the output unit is carried, in particular centrally, (a) in the region of the lumbar vertebra, or (b) in the region above the lumbar vertebra and below the armpits of the person carrying the carrying means. In this case, the upper body can be understood to mean at least substantially, in particular exactly, the region of the torso, such that the carrying means is arranged, in particular connected in a retaining manner, on the chest and/or abdomen and/or back and/or pelvis of the person. In other words, a carrying means carried on the upper body can be carried, in particular secured, on the torso of a person, i.e. on the central portion of the body without the head, neck and limbs.

It is possible for the adapter means between the carrying means and the output unit to be used as connecting means. The adapter means can for example be designed such that it holds the carrying means and the output unit at a defined angle, relative to one another, which is at least temporarily rigid or variable. In this case, it may be advantageous for the adapter means to comprise at least one swivel axis, about which a relative movement of the output unit and of the carrying means can be carried out, at least temporarily (e.g. in a latching and/or lockable manner). Thus, in particular in the embodiment of the carrying means in which it is carried on an upper body, the output unit can be adjusted to the ergonomic requirements of the person carrying the carrying means, e.g. adjustment of the angle perpendicularly to the surface of a display of the output unit, relative to the eye position of the person. It is possible for the adapter means, which can be fastened to the carrying means, to be selectively fastenable to the measuring unit via this same mechanical interface.

The output unit can for example be directly or indirectly (e.g. via an adapter means) connectable or connected in or on the carrying means. In operation as intended of the measuring unit and/or of the output unit, the output unit can be carried, via the carrying means, at least temporarily by the same person who also operates the measuring unit or a testing instrument connected to the measuring unit, the measured values of which can be output for example via the output unit. Alternatively or in addition, the output unit can be carried, via the carrying means, at least temporarily by a person who has not measured or is not measuring, by means of a measuring unit, the measured values output on the output unit. Consequently, for example, the measuring unit can be carried by a first person, and the display means by a further person.

It is possible for the measuring assembly to comprise an adapter means which (a) can be or is connected to the output unit and the measuring unit, and/or (b) can be or is connected to the output unit and a carrying means, wherein the adapter means is in particular designed such that a relative position and/or orientation of the output unit and measuring unit, or of the output unit and carrying means, relative to one another, can be changed using the adapter means. In other words, a position and/or orientation of the measuring unit with respect to the output unit and/or of the carrying means with respect to the output unit, which is changed in for example at least one, in particular at least two, degree(s) of freedom, can be set by the adapter means. In this case, the adapter means can form a separate component or a separate assembly, and can be detachably connectable or connected to the output unit and/or to the measuring unit. In this way, in comparison with a connection between the measuring unit and output unit or between the carrying means and output unit implemented without a corresponding adapter means, in particular a direct connection, the adapter means can extend or make possible in the first place a change of the measuring unit and output unit, or of the carrying means and output unit, which can be performed to a limited extent or cannot be performed. In particular if the output unit comprises a display, it is advantageous for the orientation of the display to be adjustable to the requirements of a person using the output unit, by means of the variability, on the adapter means side, of the orientation and/or position of the output unit relative to the carrying means and/or the measuring unit.

It can prove to be expedient if the same adapter means can be fastened to a measuring unit for connecting the measuring unit to the output unit, and likewise (optionally) to a carrying means for connecting the carrying means to the output unit. In this case, in both situations the adapter means can optionally be used to change the position and/or orientation of the output unit and measuring unit or of the output unit and carrying means, or to extend the degree of the possible position and/or orientation change.

The adapter means can for example comprise at least two adapter elements which are mounted so as to be rotationally and/or translationally movable relative to one another, wherein an output unit can be or is connected to a first adapter element, and measuring unit and/or (i.e. for example simultaneously or optionally) a carrying means can be or is connected to a further adapter element. In particular, the two adapter elements can be designed such that they can twist relative to one another or are rotatably interconnected via at least one axis of rotation (e.g. a region of the adapter means or of the adapter elements that is formed in a hinge-like manner). It can be provided, for example, for the relative position and/or orientation of the output unit and measuring unit to be variable, over at least one rotational and/or translational degree of freedom, using the adapter means. Preferably, the relative position and/or orientation of the output unit and measuring unit can be changed via the adapter means, via at least two different axes of rotation, i.e. for example can be rotated or pivoted about two axes of rotation that are oriented so as to be perpendicular to one another.

In the following, a carrier unit is to be described, which makes it possible to carry a measuring unit and/or an output unit on a body of a person. In order to distinguish the carrier unit, in the following the term carrying device will be used for a carrier unit by means of which at least one measuring unit can be carried, and the term carrying means will be used for a carrier unit by means of which at least one evaluation unit can be carried. Of course, the carrying device and/or the carrying means can be designed such that the measuring unit and the evaluation unit can be carried simultaneously or alternately.

In a further optional variant it can be provided for at least one relative position and/or orientation (a) of the output unit and measuring unit, and/or (b) of the output unit and carrying means, relative to one another, to be lockable, in particular using the adapter means. Locking allows for temporary blocking of the, in particular guided or predefined, mobility of the output unit and measuring unit, which exists in principle. In this case, the locking can be arranged for example on the adapter means side. The variability of the orientation and/or positioning of the output unit and measuring unit, and/or of the output unit and carrying means, can also be made possible by means of at least one rotational and/or linear bearing means on the measuring unit side and/or on the output unit side and/or on the carrying means side. In this case, an optional locking of the rotational and/or linear movement, made possible by the rotational and/or linear bearing means, can be able to be performed by locking means arranged on the measuring unit side and/or on the output unit side and/or on the carrying means side.

Alternatively or in addition, it can be provided for a change in the relative position and/or orientation of the output unit and measuring unit, and/or of the output unit and a carrier unit, preferably a carrying means, in particular via the adapter means, to be designed so as to latch in at least one predefined relative position and/or orientation. In other words, the relative change in the orientation and/or position can be brought into at least two, preferably a plurality of, predefined relative orientations or relative positions, such that said predefined orientations or positions are easier for an operator to find and/or set.

It is possible for the output unit and/or the measuring unit to comprise at least one detachable electrical energy store for supplying energy (in the state in which the energy store is fixed or inserted on the output unit and/or measuring unit) to the output unit and/or the measuring unit, wherein, in the state when detached from the output unit and/or from the measuring unit, the electrical energy store can be connected to a carrying device and/or to a carrying means and/or to a belt holding means, via a connection interface, in particular a connecting means. In, an energy store which can be fixed or inserted into the output unit and/or into the measuring unit can comprise a connection interface, which corresponds to a connection interface on the carrying device side and/or on the carrying means side. Thus for example replacement energy stores can be detachably fastenable to the carrying device and/or to the carrying means, such that a person carrying the carrying device and/or a carrying means, in the event of the need to change an energy store of a measuring unit and/or output unit operated by said person, can easily and comfortably perform a change of the electrical energy store. For example, at least one electrical energy store can be connected to the carrying device and/or to the carrying means in a force-fitting and/or form-fitting manner.

Alternatively or in addition, the measuring instrument assembly can comprise a belt holding means, which can be fastened, in particular detachably, to a belt or to a belt-like element. For example, the belt holding means is designed such that it can be fastened to a (trouser) belt which can be worn by a person. In this case, the belt holding means can function as a connection interface or as connecting means, such that a testing instrument and/or an electrical energy store can be detachably fastened to the belt by means of a force-fitting and/or form-fitting connection to the belt holding means.

It is possible for an electrical accumulator to be arranged or formed in or on the carrying device and/or in or on the carrying means, wherein, in the state when connected to the carrying device and/or in the state when connected to the carrying means, (a1) the measuring unit and/or (a2) the output unit and/or (a3) an electrical energy store b1 detached from the measuring unit and/or from the output unit, an electrical energy store of the measuring unit and/or (b2) an electrical energy store of the output unit and/or (b3) the electrical energy store detached from the measuring unit and/or from the output unit can be chargeable. The electrical accumulator can be designed a single-use battery and/or as a rechargeable electrical battery. Since the carrying device and/or the carrying means comprises an electrical accumulator, a connection of an electrical energy store means not only that this can be carried by the carrying device and/or the carrying means, but rather in addition that charging of the electrical energy store is or can be carried out. Finally, in the event of at least two electrical energy stores detachably fastened in or on the carrying device and/or the carrying means simultaneously, one of said electrical energy stores can be understood as an accumulator in the meaning above, whereupon at least one of the electrical energy stores charges the further energy store carried by the carrying device and/or by the carrying means. The electrical accumulator can for example be detachably or non-detachably connected or fastened in or on the carrying device and/or in or on the carrying means.

Alternatively or in addition, it can be provided for the measuring unit and the output unit to comprise a single electrical energy store or to be operable by means of a single electrical energy store. In other words, the measuring unit and the output unit each comprise a single electrical energy store, which can be inserted or connected both in the measuring unit and in the output unit, and can supply the relevant unit with electrical energy. Thus, the number of carry-over parts and the operating comfort of the measuring instrument assembly is increased.

It may prove to be expedient for the measuring instrument assembly to comprise for example a testing instrument, in particular a testing instrument designed as a test probe, which can be connected to the measuring unit via at least one connection cable. In particular, the testing instrument comprises a test tip or a test tip body, and a testing instrument main body, wherein optionally different test tips can be connected or fixed to at least one testing instrument main body. The connection cable can be for example detachably connectable to the testing instrument and/or detachably connectable to the measuring unit. Thus, in the case of a fault and/or depending on the measuring environment, the connection cable can be exchanged in a simple and comfortable manner. Alternatively or in addition, at least one first test tip and at least one further test tip can be fastened or able to be fastened, simultaneously or optionally, to the carrying device and/or to the carrying means and/or to the belt holding means. Thus, a person can grasp and/or release from their hand, in a simple and comfortable manner, a test tip and/or testing instrument body which is located within the space that is in easy reach of said person. It can optionally be provided for the testing instrument to comprise an output element and/or input element; in particular, the output element and/or the input element is arranged or formed on the testing instrument tip body and/or on the testing instrument main body. The input element on the testing instrument side can for example be designed as an element that records haptic and/or optical and/or acoustic information (e.g. button and/or light-sensitive sensor and/or microphone). For example, the input element is designed as a rotary switch, and can in particular be used for modifying a main function of the measuring unit or of the measuring electronics, e.g. a selection of a (a) measuring range, and/or thereby whether (b) a voltage and/or (c) a resistance measurement, and/or what (d) range of a voltage and/or resistance measurement is carried out.

The output element on the testing instrument side can output an optical and/or haptic and/or acoustic signal which can be perceived by at least one person carrying the testing instrument. For example, a sound signal and/or a light signal is output, which outputs an item of good/bad information, such that for example in the case of an output item of good information, the operator generally does not have to look at the output unit (referred to as "no look" check), in order to read a specific measured value there since in the good case said specific measured value is typically not of interest. If, in contrast, an item of bad information is output via a correspondingly clear signal of the output element on the testing instrument side, the operator is compelled to use the output unit in order to look at or retrieve further information on the latest measurement made. This makes it possible for an operator to be able to perform a plurality of measurements in a simple and comfortable manner, and simultaneously has to perform few operations in the process.

The carrying device and/or the carrying means can for example comprise an opening (e.g. an aperture) on a wall that forms the receiving region for the measuring unit, in order, in the state in which the measuring unit is inserted in the receiving region, to receive the connection cable in said opening or guide said connection cable through said opening. It can preferably be provided, for example, for the measuring unit to be removable from the receiving region in the state when it is connected to the connection cable. For this purpose, the opening can be designed as an opening that is designed so as to be open at one end side, e.g. as a slot that is designed so as to be open at one end side, which allows for a movement of the connection cable from a position of the measuring unit in which it is received in the receiving region, to a state separated or spaced apart from the carrying device (i.e. for example in a position removed from the receiving region), without the connection cable being "trapped" in the opening. In other words, an indirect or direct insertion and a detachment of the measuring unit, in a receiving region of the carrying device and/or of the carrying means, can be performed, without a connection cable having to be unplugged from the measuring unit for this purpose since the wall of the carrying device and/or of the carrying means on the receiving region side makes it possible for at least one portion of the connection cable to be moved in the opening in such a way that the movement of the measuring unit relative to the carrying device or to the carrying means is not impaired.

The measuring instrument assembly can for example comprise at least one stand unit, wherein an output unit and/or a measuring unit can be or is connected to the stand unit and the stand unit is designed such that purposeful orientation and/or positioning of the output unit and/or measuring unit connected to the stand unit, relative to an installation surface of the stand unit, can be carried out. The stand unit makes it possible, for example, to place or hold the output unit, in the state detached from the measuring unit, on an uneven and/or slanting plane in a statically secure state and in a desired orientation and/or position relative to the installation surface, in that the stand unit installed on the installation surface can be adjusted such that a desired orientation and/or position of the measuring unit, connected to an interface of the stand unit, can be set or achieved. For this purpose, the stand unit can comprise for example three flexible support legs, the shape and/or length of which can be adjusted.

The measuring unit and/or output unit can for example be indirectly or directly connectable or connected to the stand unit. An indirect connection can be achieved for example by "interposing" an adapter means, wherein the adapter means can function as the exclusive connection of the stand unit and output unit or measuring unit. Thus, for example, a bearing or movement mechanism on the adapter means side can allow for a relative movement (e.g. rotational movement and/or linear movement) of the output unit and stand unit.

It is possible for (a) the output unit and the measuring unit, and/or (b) the output unit and a functional unit, and/or (c) the measuring unit and a functional unit, to be interconnectable or interconnected in a force-fitting and/or form-fitting manner, via corresponding connecting means. In particular, the functional unit comprises an electrical energy store and/or a carrying device and/or a carrying means and/or an adapter means and/or a belt holding means and/or a testing instrument and/or a receiving body and/or a stand unit and/or a conductor means (e.g. cable drum) and/or a conductor means holder (e.g. cable drum holder) and/or a handle and/or a support means, or is designed as an element of this kind. In other words, in addition to the output unit and the measuring unit, a unit performing a function of the measuring instrument assembly can be understood to be a functional unit. The function of the measuring instrument assembly can relate both to the actual measuring function and to a carrying and/or a bearing and/or a storage and/or a maintenance function, and is in this case not limited to the stated functions. This modular design of the connectability or the mechanical or carrying connection interface of the units (measuring unit, output unit, functional unit) makes it possible to achieve a measuring instrument assembly which can be handled comfortably.

In this connection, for example connecting means can be designed as form-fitting means and, in particular corresponding, mating form-fitting means. Alternatively or in addition, for example connecting means can be designed as magnet means and, in particular corresponding, mating magnet means. In particular corresponding connecting means on the output unit and the measuring unit and at least one functional unit can be designed similarly or identically, such that an output unit or a functional unit can be fastened, alternately, to a measuring unit by means of similar or identical connecting means. Alternatively it is possible for an output unit and a functional unit to be fastened, in particular simultaneously, to a measuring unit.

It is possible for the measuring instrument assembly to comprise a conductor means. A conductor means can for example comprise a cable which can be used for extending a current-carrying connection; typically, cables of this kind are referred to as extension cables or as adapter cables, wherein this can enter into an electrically conductive connection, e.g. with the measuring unit and/or the testing instrument and/or the output unit, via end plug connections. For example, the conductor means is provided as a cable that is wound on a drum-like carrier (cable drum). Alternatively or in addition, the measuring instrument assembly can comprise a conductor means holder. Said conductor means holder can be connectable to other elements (output unit, measuring unit, other functional unit) of the measuring instrument assembly via a connection, in particular via the modular connection interface for fastening at least the output unit to the measuring unit.

It is possible to provide a handle as an element of the modularly constructed measuring instrument assembly, wherein the handle can be connected to other elements (e.g. output unit, measuring unit, functional unit) of the measuring instrument assembly via the modular connection interface, via which at least the output unit can be connected to the measuring unit. In the connected state of the handle, the measuring instrument assembly or components of the measuring instrument assembly, in the form of a cohesive module, can be carried by one person, via said handle, in particular only by the handle.

It is possible to provide a support means which, in the state when connected to a carrying device and/or a carrying means, allows for secure placement of the carrying device and/or of the carrying means on the ground or an installation surface. In this case, the support means can be designed such that, in the state when the carrying device and/or the carrying means is/are equipped as intended, it allows sufficient support, such that a carrying device or carrying means deposited on the ground does not fall over. In a preferred embodiment, the support means and a conductor retaining means can be formed in the component, or can form a common, detachably or non-detachably interconnected or interconnectable, module.

The modular connection interface, in particular also of the conductor means, the conductor means holder, the handle and/or the support means, can comprise corresponding connecting means which can be connected in a force-fitting and/or form-fitting manner, wherein the corresponding connecting means (a) on the output unit and the measuring unit and (b) at least one functional unit are designed similarly or identically. Said similar or identical design can be configured for example such that an output unit or a functional unit can be fastened, alternately, to a measuring unit by means of similar or identical connecting means.

In an advantageous embodiment, the connecting means are designed as a standardized interface of the measuring unit and the output unit, and simultaneously at least one functional unit. The detachment and the separation of the two connection partners of the connecting means can also be performed differently. It can thus be provided, for example, for a simple connection to be made possible, while a separation of the connection is more difficult to achieve or is achieved by a further measure (e.g. actuation of a bolt).

It can be provided for example for a first connecting means to be arranged or formed on the output unit, and for a further connecting means, which is different from the first connecting means and can be connected to the first connecting means, to be arranged or formed on the measuring unit, wherein at least one first functional unit comprises a first connecting means, and at least one further functional unit, which is different from the first functional unit, comprises a further connecting means. It is thus possible to specify, to a certain extent, whether or not a measuring unit and/or an output unit can be connected or coupled to a particular functional unit. In this way, possible connection partners of the measuring unit, of the output unit, and/or of at least one functional unit can be predetermined in a defined manner. For example, a first output unit and a further output unit can also be directly interconnected via the connecting means thereof since both comprise e.g. first connecting means and no second connecting means corresponding thereto. A first connecting means is to be understood as a first geometry and/or a first magnetic polarity, which is designed to correspond to or to enter an at least temporary connection with the geometry and/or with the magnetic polarity of a second connecting means.

It is possible for two interconnectable connecting means to form, in the connected state, a rigid, in particular a twist-proof or a relative rotation-preventing, connection. For example, a connecting means comprising an engagement element can comprise two mutually spaced accentuations, and the corresponding connecting means comprise at least two recesses which correspond to the engagement element, such that, in the engagement state, a non-rotatable or rotationally fixed connection can be established.

Alternatively or in addition it is possible, depending on the connection partners, for the same unit to on one occasion form a rigid connection, i.e. a connection that excludes a relative movement, and, in the case of the connection of said unit to another connection partner (e.g. a functional unit), to form a non-rigid, i.e. relatively movable, connection. For example, in the state when indirectly or directly connected to the display unit via the connecting means, the measuring unit can form a rigid, in particular twist-proof, connection, wherein at least one functional unit, in the state when connected to the measuring unit and/or to the display unit, does not form a rigid, in particular does not form a twist-proof, connection via the same connection point on the measuring unit side and/or the display unit side.

In addition to the measuring instrument assembly, the invention also relates to a measuring instrument apparatus for use in a measuring instrument assembly described herein. In particular, the measuring instrument apparatus comprises an output unit and a measuring unit which are or can be detachably connected to one another and optionally to further functional elements.

Furthermore, the invention relates to a measuring unit and/or an output unit for use in a measuring instrument apparatus of a measuring instrument assembly described herein. Finally, the invention relates, alternatively or in addition, to a functional unit, in particular a carrier unit and/or a carrying means and/or an electrical energy store and/or a testing instrument and/or an adapter means and/or a belt holding means and/or a receiving body, for use in a measuring instrument assembly described herein.

All the advantages, details, embodiments and/or features of the measuring instrument assembly according to the invention can be transferred or applied to the measuring instrument apparatus according to the invention, the measuring unit according to the invention, the output unit according to the invention, and to a functional unit according to the invention.

BRIEF DESCRIPTION OF THE DRAWINGS

The invention will be explained in greater detail with reference to embodiments that are shown in the figures.

FIG. 24 is a table showing the possible fastening options of the output unit, the measuring unit and the functional units of the measuring instrument assembly, according to an embodiment.

FIG. 25 is a table showing the possible fastening options of the output unit, the measuring unit and the functional units of the measuring instrument assembly, according to an embodiment.

DETAILED DESCRIPTION

Figure 1:
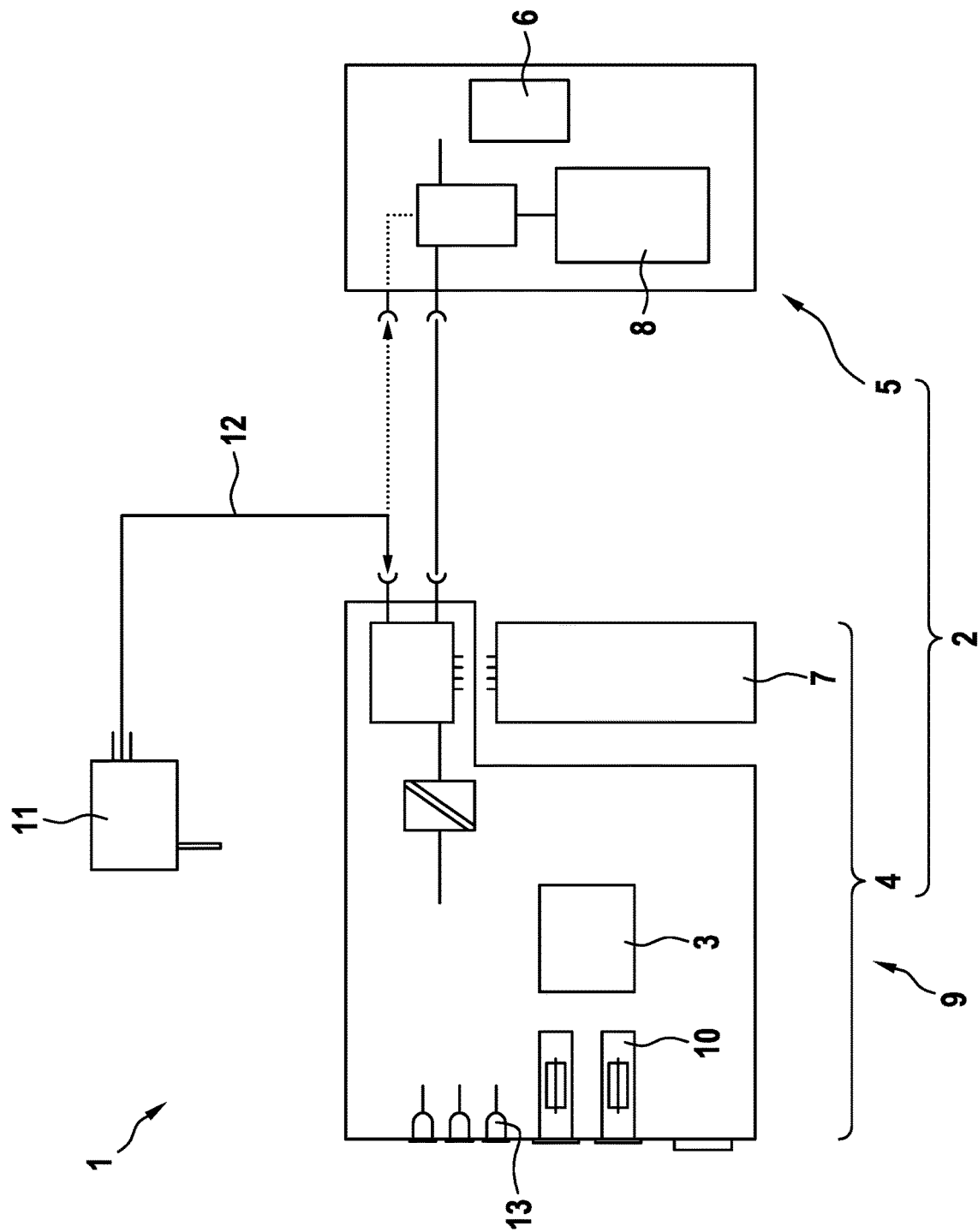
FIG. 1 is a schematic view of data and/or energy transmission interfaces between units of a measuring instrument assembly according to an embodiment.

It is clear from FIG. 1 that individual elements of a measuring instrument assembly 1 are connected via data and/or energy lines. The measuring instrument assembly 1 comprises a measuring instrument apparatus 2 for measuring electrical measurement variables, wherein the measuring instrument apparatus 2 comprises a measuring unit 4 comprising measuring electronics 3, and an output unit 5 comprising at least one output means 6. It can be possible for an item of information generated from the measuring unit 4 and/or relating to the measuring unit 4 to be output via the output unit 5. In this case, the output unit 5 can be or is detachably, i.e. non-destructively detachably, connected to the measuring unit 4, cf. FIG. 2.

The measuring unit 4 and/or the output unit 5 comprises or comprise an electrical energy store 7, 8. At least one energy store 7, 8 can for example be arranged or able to be arranged detachably, i.e. non-destructively detachably, in or on the measuring unit 4 and/or the output unit 5. For example, an electrical energy store 7 is inserted or fixed in a receiving portion of a main body 9 of the measuring unit 4. The main body 9 of the measuring unit 4 can for example receive the measuring electronics 3. At least one securing means 10 can be arranged in or on the main body 9 so as to be detachable, preferably without dismantling a housing or housing component that forms the main body 9. A charging cable 12 provided with a plug 11 can be connectable to the main body 9 of the measuring unit 4 and/or to the output unit 5, by means of said plug 11 the measuring unit 4 and/or the output unit 5 can be connected to an external energy supply network (e.g. household plug socket), and used for the operation of the measuring unit 4 and/or the output unit 5 and/or for the charging of an electrical energy store 7, 8 arranged on the measuring unit side and/or on the output unit side. The plug 11 and/or the charging cable 12 can in particular be designed purely as a power pack, such that it does not form a charging device, and influencing of the charging event (control and/or monitoring of the charging process), which may be required for charging the electrical energy store 7, 8, is arranged or can be implemented on the measuring unit side and/or the output unit side and/or the energy store side.

The main body 9 of the measuring unit 4 comprises at least one interface, in particular a testing instrument connection socket 13, for supplying a test current into the measuring unit 4 or to the measuring electronics 3. At least one testing instrument 14, in particular a test probe, can be connected indirectly or directly to the at least one testing instrument connection socket 13. In this case, the testing instrument 14 is preferably connected to the measuring unit 4 via a connecting body, in particular via a connection cable 15.

The output unit 5 can comprise at least one input means 16, wherein a control signal acting on the measuring unit 4, and/or an item of information that can be associated with a measured value that is determined and/or is to be determined via the measuring unit 4, and/or an item of information that modifies a measured value determined via the measuring unit 4, can be input via the input means 16. The input means 16 can be designed for example as a button and/or as a touch screen and/or as rotating means 17, cf. FIG. 4. An input means 16 designed as rotating means 17 can for example comprise an axis of rotation which extends in parallel with an outside edge of a housing forming the output unit 5. The rotating means 17 is preferably arranged off-center, in or on the housing. In the embodiment shown in FIG. 4, the rotating means 17 is designed as a cylindrical body, wherein at least the lateral surface of the rotating means 17 is exposed, at least in portions, in particular completely, over the axial and/or radial extent of the rotating means 17. It can optionally be provided for the rotating means 17 to overhang or protrude, at least in regions, beyond at least one surface 18, 19 of the housing of the output unit 5 that forms the output unit 5. The rotating means 17 is preferably raised, at least in portions, relative to a main extension surface 18 and/or over a lateral surface 19 of the, preferably cuboid, housing of the output unit 5. Comfortable operation of the rotating means 17 can be achieved by the region of the rotating means 17 that protrudes, at least in portions, with respect to at least one surface 18, 19 of the output unit 5. Thus, for example, the rotating means 17 can be touched or operated by the thumb of the left hand, and in the process the output unit 5 itself can be held with the right hand and/or with the left hand. It can thus be possible for the rotating means 17 to be arranged close to a lateral edge or to a lateral surface 19 of an, in particular cuboid, output unit 5, in such a way that, despite holding laterally or on the lateral surface 19, by means of a hand, the rotating means 17 can be operated using a finger, in particular using the thumb and/or the forefinger and/or the middle finger, of the holding hand.

The output means 6 shown in the figures can be designed for example as a screen, in particular as a touch-sensitive screen (e.g. touch screen).

FIGS. 6, 7, 8, 9, 14, 15, 16 and 17 show carrier units 20, some of which are designed differently, via which a measuring unit 4 and/or an output unit 5 can be indirectly or directly carried by a person. In the following, the term "carrying device" 21 means a carrier unit 20 for carrying at least the measuring unit 4, and the term "carrying means" 28 means a carrier unit 20 for carrying at least the output unit 5. Of course, a carrier unit 20 and thus a carrying device 21 and/or a carrying means 28 can be designed or configured for carrying the measuring unit 4 and, simultaneously or alternately, the output unit 5. Consequently, a measuring unit 4 can be or is connected in or on a carrying device 21 which can be carried by a person. In particular the carrying device 21 is designed or configured such that the measuring unit 4 can be carried in the region of the back of a person, via the carrying device 21, cf. FIG. 15.

The carrier unit 20, in particular the carrying device 21 and/or the carrying means 28, can be designed for example as part of an outer garment. Thus, the measuring unit 4 and/or the output unit 5 and/or a functional unit 46 can be detachably fastened to a piece of clothing which is designed for example in the manner of a jacket, a coat or a waistcoat. In particular, this detachable fastening is achieved using connecting means 47, 47'.

The carrying device 21 can for example comprise a receiving region 23 which is defined at least in portions, in particular completely, by a wall portion 22 and is intended for indirectly or directly receiving the measuring unit 4.

In the embodiment shown in the figures, the measuring unit 4 is arranged in a receiving body 50 and is fastened to the carrying device 21, together with the receiving body 50. The receiving body 50 can be designed for example in the manner of a case or container, cf. FIG. 11.

Figure 18:
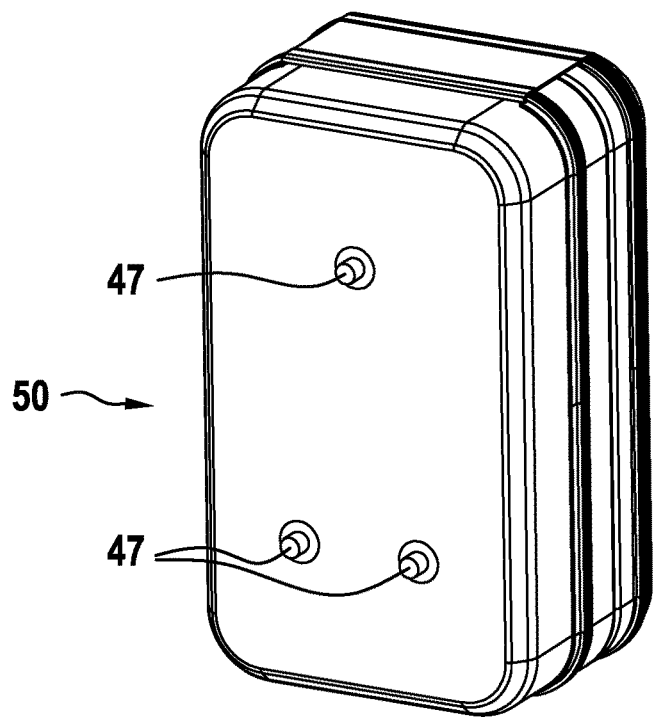
FIG. 18 is a schematic perspective view of a contact surface of a receiving body that can be inserted into a receiving region on the carrying device side, according to an embodiment.

The receiving body can be provided on at least one surface with at least one connecting means 47 which can be connected to a connecting means 47' arranged on the carrying device side. In the embodiment shown in FIGS. 17 and 18, the receiving body 50 comprises at least two, in particular three, connecting means 47 which, in the assembled stated of the receiving body 50 and carrying device 21, correspond or connect to connecting means 47' arranged on the carrying device side. In this case, a locking means or a closure element 31 can be arranged at least one connecting means 47, 47' and/or in the region of at least one connecting means 47, 47', which locking means or closure element secures the assembled state and prevents unintentional detachment of the receiving body 50 from the carrying device 21. For example, said connection can be released or detached only by intentional action, e.g. an actuation of an actuation means 49.

Figure 13:
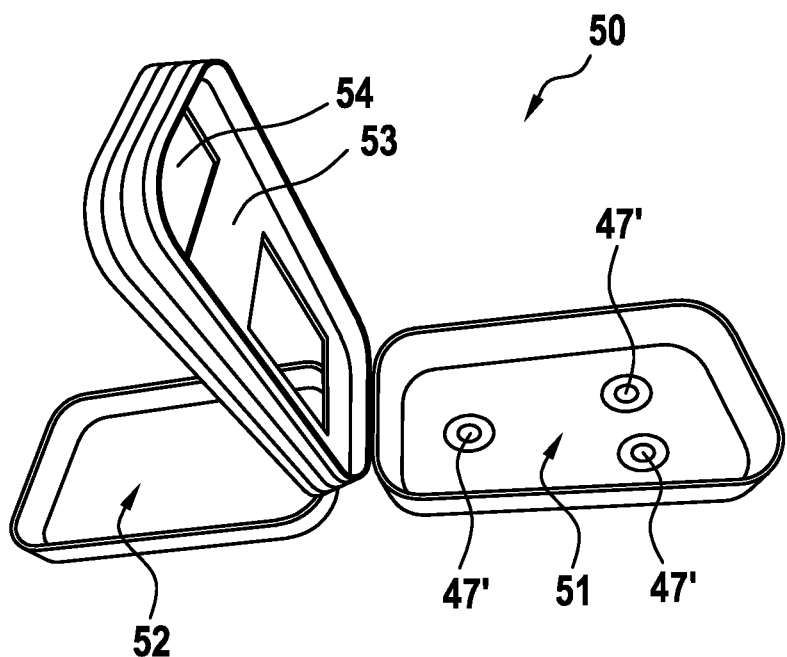
FIG. 13 is a schematic perspective view of a receiving body according to an embodiment, wherein a partition wall of the receiving body comprises an aperture.

For example, the receiving body 50 comprises two receiving chambers 51, 52, wherein the receiving chambers 51, 52 can be separated or can be at least temporarily separable by means of a partition wall 53. According to the embodiment shown in FIG. 13, the partition wall 53 can be provided with at least one aperture 54. The aperture 54 makes it possible to guide a cable, connected in a first receiving chamber 51, into a second receiving chamber 52. Thus, the measuring unit 4 can be placed in a first receiving chamber 51 for example. Thereafter, said receiving chamber 51 can be spatially separated from the second receiving chamber 52 by closing the partition wall 53. The aperture 54 of the partition wall 53 can be dimensioned and/or formed such that a measuring unit 4 received in the first receiving chamber 51 cannot be guided through, such that the measuring unit 4 can be "trapped" in the first receiving chamber after closing the partition wall 53.

The aperture 54 can make it possible to guide a connection cable 15, connected to a measuring unit 4 received in the first receiving chamber 51, and/or a charging cable 12, through the aperture 54, such that said cable reaches into the second receiving chamber 52 or can extend, at least in portions, as far as into the second receiving chamber 52. A connection and/or charging cable 15, 12 located in the second receiving chamber 52 can now be guided towards the outside of the receiving body 50, via an opening region 55 that connects the second receiving chamber 52 to an outside of the receiving body 50. This makes it possible to guide a cable out to the outside region of the receiving body 50, from the first and/or second receiving chamber 51, 52, via just one interface. The just one interface reduces the risk of contamination or penetration of dirt into the first and/or second receiving chamber 51, 52.

The opening region 55 for guiding out at least one cable, in particular a connection and/or charging cable 15, 12, can for example comprise a resilient element which keeps the effective opening cross section as small as possible. For example, in the case in which no cable is guided through the opening region 55, the resilient element can close the opening cross section as far as possible. For example, the resilient element is a preferably foamed, resilient plastics material, or is designed in a brush-like manner.

The opening region 55 can be formed for example in the region, in particular on an end region, of a slide fastener which temporarily closes the opening of the first receiving chamber 51.

For example, the output unit 5 can be received in the second receiving chamber 52. In particular, the aperture 54 is dimensioned and/or formed or designed such that, in the state in which the second receiving chamber 52 is closed by the partition wall 53, it is not possible to guide the output unit 5 through from the second receiving chamber 52 to the first receiving chamber 51. In other words, the aperture 54 can be dimensioned and/or formed or designed such that, in the state in which the second receiving chamber 52 is closed by the partition wall 53, the output unit 5 received in the second receiving chamber 52 is trapped.

Figure 14:
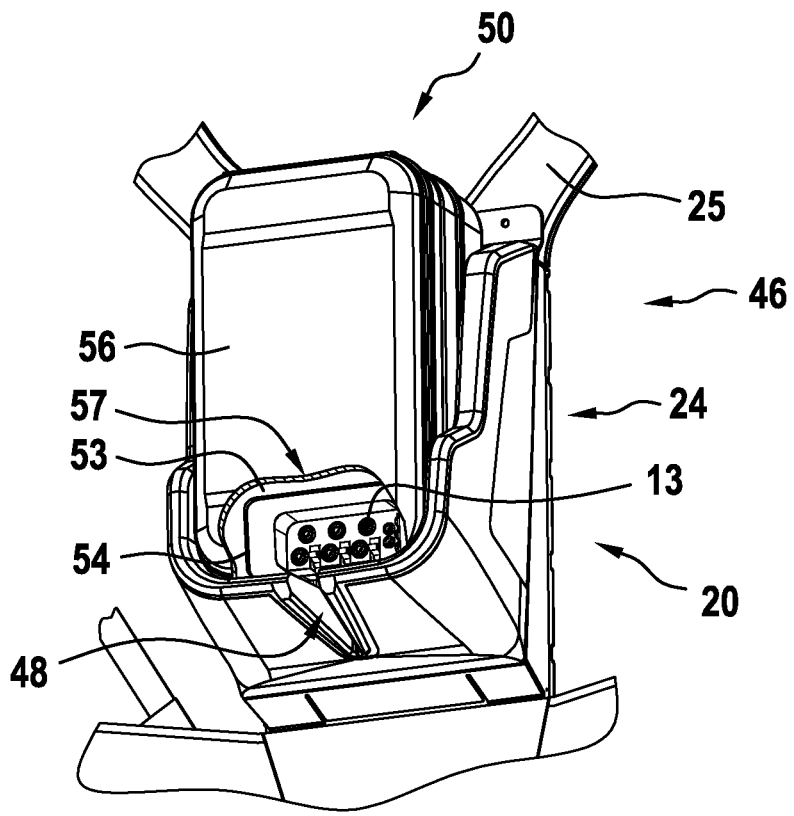
FIG. 14 is a schematic perspective view of a receiving body inserted in a receiving region on the carrying device side.

In the embodiment shown in FIG. 14, the cover wall portion 56, which closes the second receiving chamber 52 to the outside, is shown broken open in part, see arrow 57, which shows the region that is broken open. The region broken open makes it possible to see the aperture 54 of the partition wall 53 and the plug socket portion of the measuring unit 4 located therebelow and arranged in the first receiving chamber 51. In this case, the plug socket portion can for example comprise at least one testing instrument connection socket 13 and/or a charging cable connection socket. It can prove to be advantageous if, as shown in FIG. 14, the plug socket portion, in particular at least one testing instrument connection socket 13 and/or at least one charging cable connection socket, is arranged or formed relative to an aperture 54 of the partition wall 53 such that insertion and/or unplugging of a plug, to be inserted into or removed from the plug socket portion, can be carried out during a state in which the first receiving chamber 51 is closed by the partition wall 53. In other words, when the second receiving chamber 52 is open, by means of guiding a plug through the aperture 54, said plug can be connected to or disconnected from the measuring unit 4, while the measuring unit 4 is placed in the first state, closed by the partition wall 53, of the first receiving chamber 51.

Figure 11:
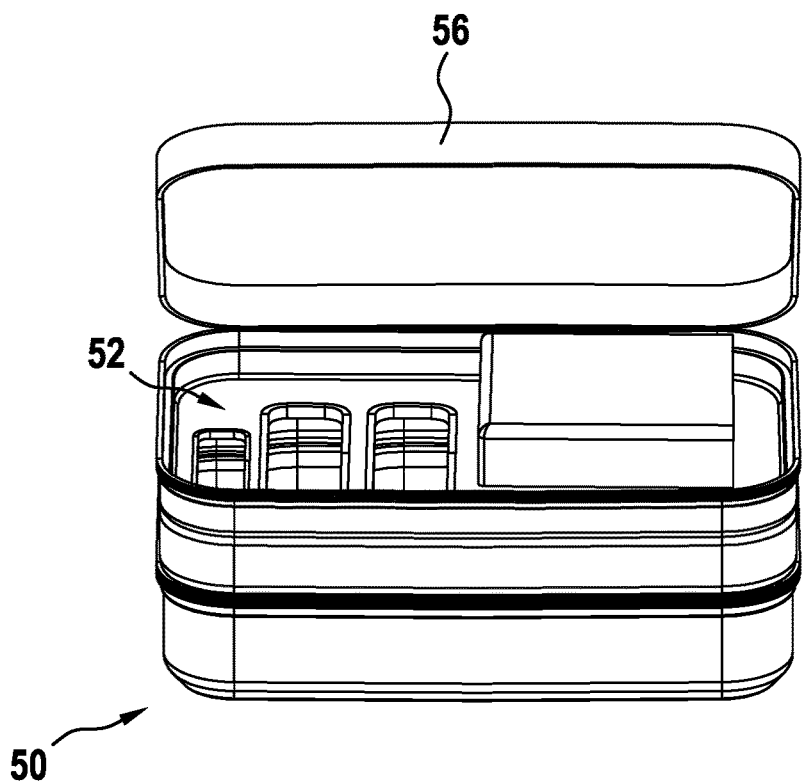
FIG. 11 is a schematic view of a partially opened receiving body according to an embodiment.

FIG. 11 shows a receiving body 50, the second receiving chamber 52 of which is open, and the first receiving chamber 51 of which is closed. At least one bag or a fastening means can be arranged or formed in the second receiving chamber 52, which allow for fastening and/or secure receiving of the output unit 5 in the second receiving chamber 52. A similar bag and/or fastening can be arranged or formed in the first receiving chamber 51, for fastening and/or receiving the output unit 5. For example, a fastening of this kind can be formed by a belt (not shown), which can be secured and fixed, at least in portions, via an output unit 5 and/or measuring unit 4. For example at least one, in particular three, connecting means 47 can be arranged in the first receiving chamber 51 such that fastening of a measuring device 4 received in said first receiving chamber 51, in particular of a receiving body 50 received in the first receiving chamber 51, can be achieved via said connecting means 47 on the receiving chamber side. For this purpose, in the state in which the receiving body 50 is inserted into the receiving chamber 51, the connecting means 47 on the receiving body side can be brought into engagement with the connecting means 47 on the receiving chamber side, cf. FIGS. 13 and 18.

Figure 12:
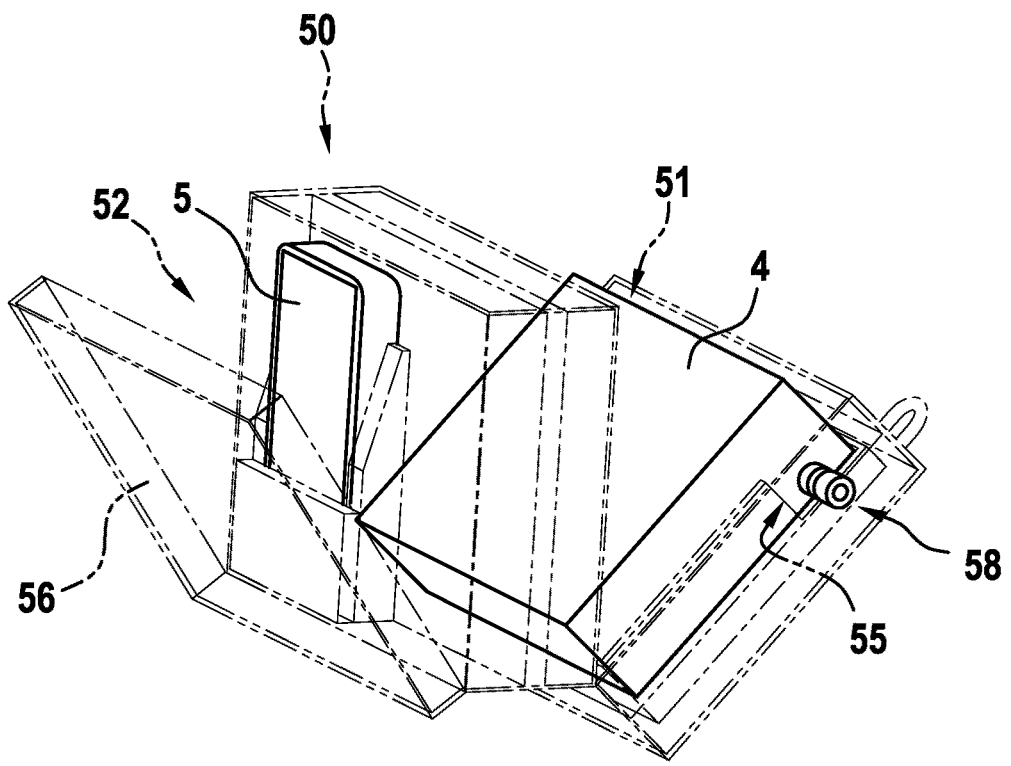
FIG. 12 is a schematic perspective view of a receiving body, shown partially transparent, according to an embodiment.

In FIG. 12, the receiving body 50 is shown partially transparent, wherein the measuring unit 4 is arranged or formed in the first receiving chamber 51, and the output unit 5 is arranged or formed in the second receiving chamber 52, which is separated from the first receiving chamber 51 by the partition wall 53. It can be provided for example for a cable, in particular a charging and/or connection cable 12, 15, to be guided or to be able to be guided from the measuring unit 4 arranged in the first receiving chamber 51, directly to the outside of the receiving body 50, cf. arrow 58 in FIG. 12

Figure 15:
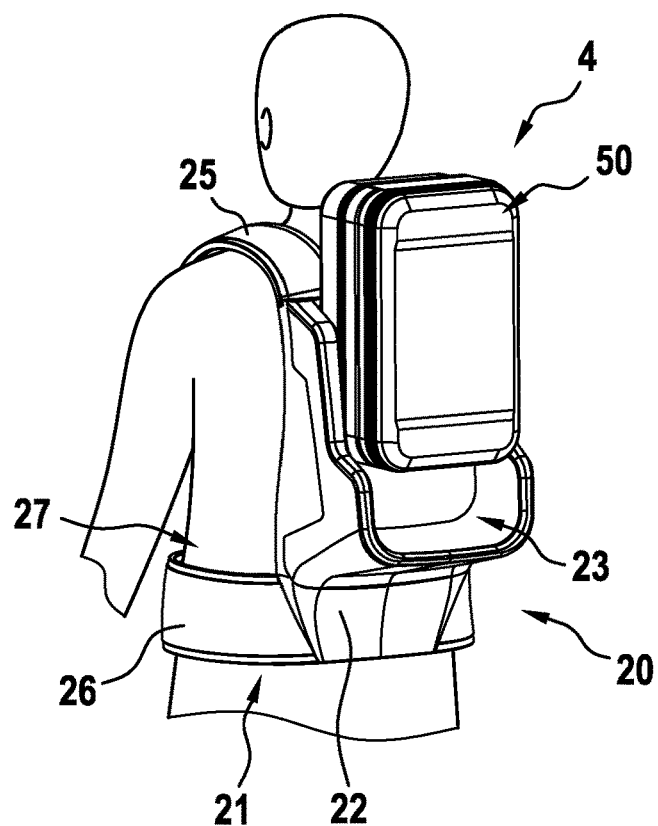
FIG. 15 is a schematic perspective view of a receiving body received in part in a receiving region of a carrying device, according to an embodiment.
Figure 16:
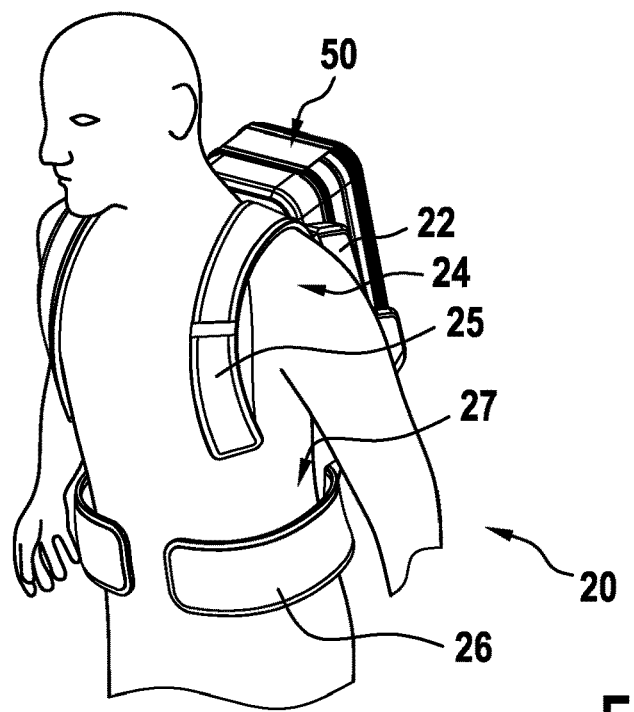
FIG. 16 is a schematic perspective view of a carrying device provided with a strap element, according to an embodiment.
Figure 17:
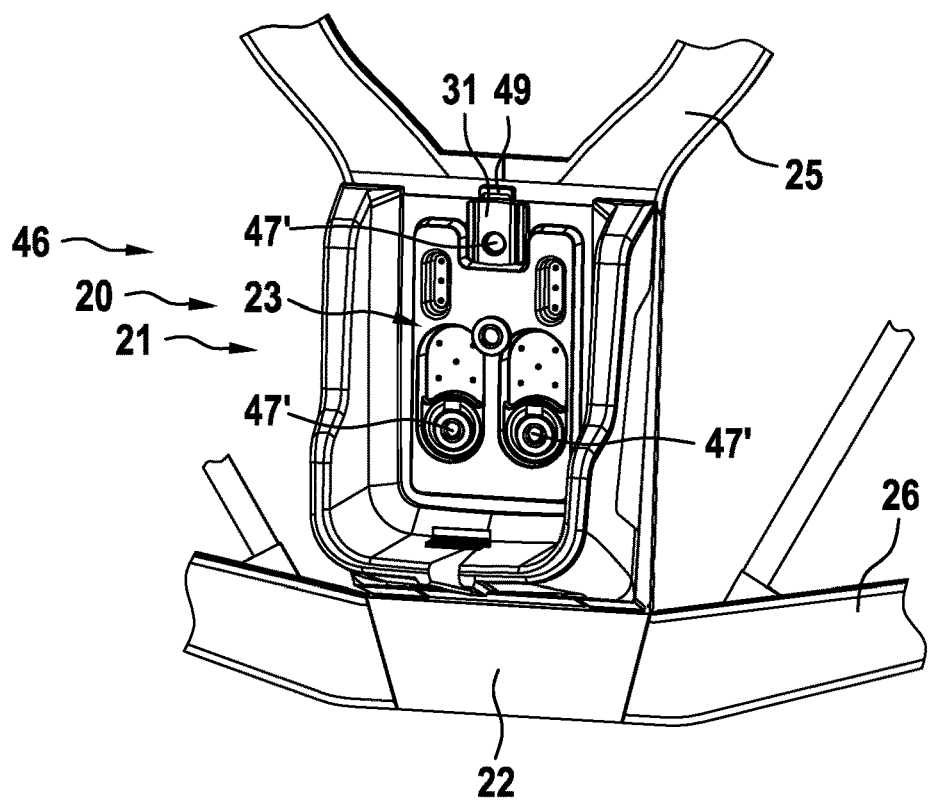
FIG. 17 is a schematic perspective view of a receiving region on the carrying device side, according to an embodiment.

The wall portion 22 of the carrying device 21 can for example surround the receiving region 23 in a U-shaped manner, such that the measuring unit 4 or the receiving body 50 can be introduced into the receiving region 23 via the free or open region of the U-shaped wall portion 22, cf. FIG. 15. The wall portions 22 can be of a constant height or of different heights; in the embodiment shown, the wall portion 22 is of different heights at different sites, cf. FIG. 15.

The wall portion 22 of the carrying device 21 can for example comprise an opening 48 which is designed and/or formed such that, in the state in which the carrying device 21 and the measuring unit 4 are assembled, in particular a measuring unit 4 received in a receiving body 50, a connection cable 15 guided from the measuring unit 4 to a testing instrument 14 can be guided through the opening 48 or is located there. The opening 48 can for example, as shown in FIG. 14, be designed as a region that is open on one side, or as a U-shaped opening 48 of the wall portion 22. As a result, insertion and separation or removal of a measuring unit 4, in particular positioned in a receiving body 50, into or from the receiving region 23 of the carrying device 21 can be made possible, wherein the connection cable 15 always remains connected to the measuring unit 4 and the testing instrument 14. In this case, the opening 48 can be arranged or formed such that it coincides with the opening region 55 and/or with the insertion and/or retraction movement of the measuring unit 4 or of the receiving body 50 receiving the measuring unit 4, such that a cable, in particular a charging and/or connection cable 12, 15, can remain connected to the measuring unit 4, during the insertion and/or retraction movement.

The carrying device 21 can be placed or carried on at least one shoulder of a person carrying the carrying device 21, via a carrying system 24 which comprises at least one shoulder element 25. In particular, the at least one shoulder element 25 is designed as a shoulder strap. In addition and/or as an alternative to a shoulder element 25, the carrying system 24 of the carrying device 21 can comprise at least one hip element 26, wherein a connection between the carrying system 24 and a hip region 27 of a person carrying the carrying device 21 can be established via the hip element 26.

The shoulder element 25 and/or the hip element 26 can be designed in a strap-like manner and can thus have a minimum rigidity which makes it possible to establish a carrying function between the body part of the person and the carrying system 24, without entirely surrounding a body extremity or limb of the person by the shoulder element 25 and/or the hip element 26. In this case, the strap-like shoulder and/or hip element 25, 26 can have a non-limp property. The shoulder and/or hip element 25, 26 can comprise a cushion portion (not shown), at least in portions, in particular in the region of the contact surfaces for contact with a person carrying the carrying system 24, wherein the cushion portion can be connected to a carrier body (not shown) having the non-limp property, which ensures the actual carrying function.

For example, the output unit 5 can be connected in or on the carrying means 28, and can thus be able to be carried, by means of a carrying means 28 that can be carried by a person, cf. FIGS. 6 to 9. For example, the carrying means 28 is designed or configured such that the output unit 5 can be carried or is portable, via the carrying means 28, on a hand region and/or an arm region 29 of a person. In this case, the carrying means 28 can for example comprise a base body 30 on which, in particular via a connecting means 47, the output unit 5 can be detachably fastened. The base body 30 can be fastened to a hand and/or arm region 29 for example by means of at least one strap portion 32, in particular provided with a hook and loop fastener (barbed hook principle, which interact with loops).

The carrying means 28 shown in FIGS. 6 to 9 comprises a finger portion 33 which reaches into a hand and/or finger region of the person carrying the carrying means 28, and an arm portion 34 arranged in the arm region 29 of the person. By means of the connection or by means of an extension of the finger portion 33 of the carrying means 28 extending for example between the thumb and at least one further finger of the hand, twist prevention of the carrying means 28 relative to the arm carrying the carrying means 28 can be achieved. In other words, the base body 30 of the carrying means 28 can comprise a geometrically shaped or formed region, which, when the carrying means 28 is used as intended, performs a twist prevention function and/or prevents twisting of the carrying means 28 relative to the arm.

In particular if a twist prevention means is provided between the carrying means 28 and the arm, it can prove to be advantageous for the base body 30 to be designed such that, in the state in which the carrying means 28 and the output unit 5 are connected, in the case of an arm extended forwards, the output unit 5 is inclined inwardly, about the longitudinal axis of the arm, i.e. towards the head or center of the person carrying the carrying means 5. This makes it possible for, on the one hand, the output unit 5 to always have a defined orientation relative to the arm (twist prevention), and in addition, by means of the design of the base body 30 that allows for an inclined arrangement, for an output means 6 of the output unit 5 to be easy and comfortable for a person carrying the carrying means 5 to observe and/or operate, cf. FIGS. 8 and 9.

Figure 2:
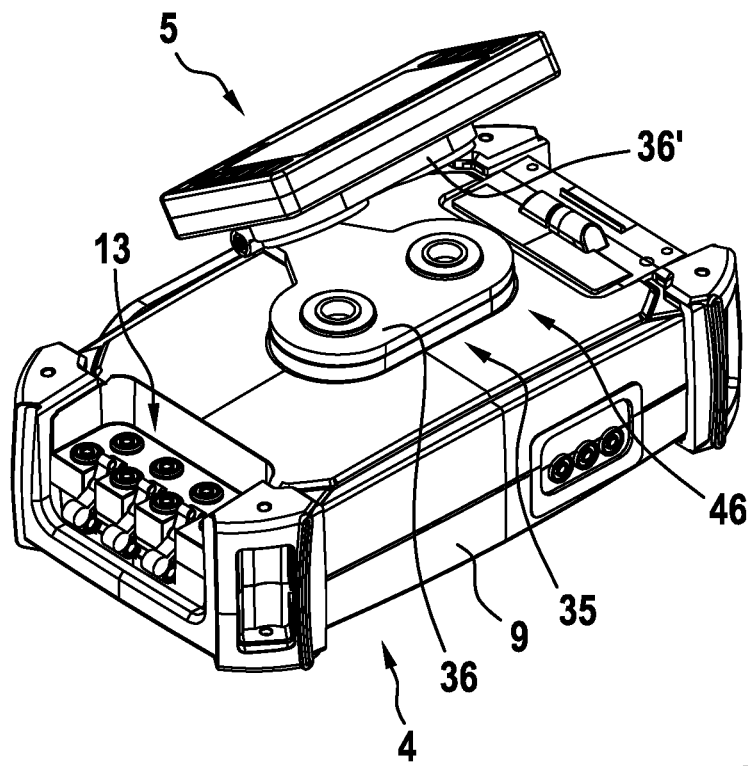
FIG. 2 is a schematic perspective view of an output unit fastened to a measuring unit via an adapter means, according to an embodiment.
Figure 3:
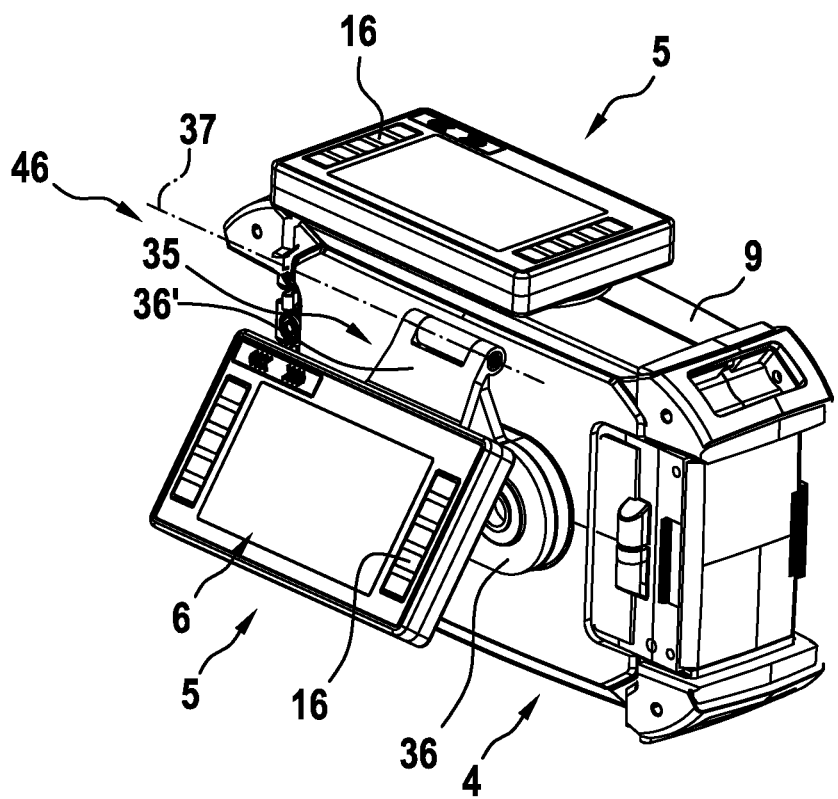
FIG. 3 is a schematic perspective view of an output unit directly arranged on the measuring unit, and an output unit that is additionally or alternatively arranged or formed on the measuring unit via an adapter means, according to an embodiment.
Figure 4:
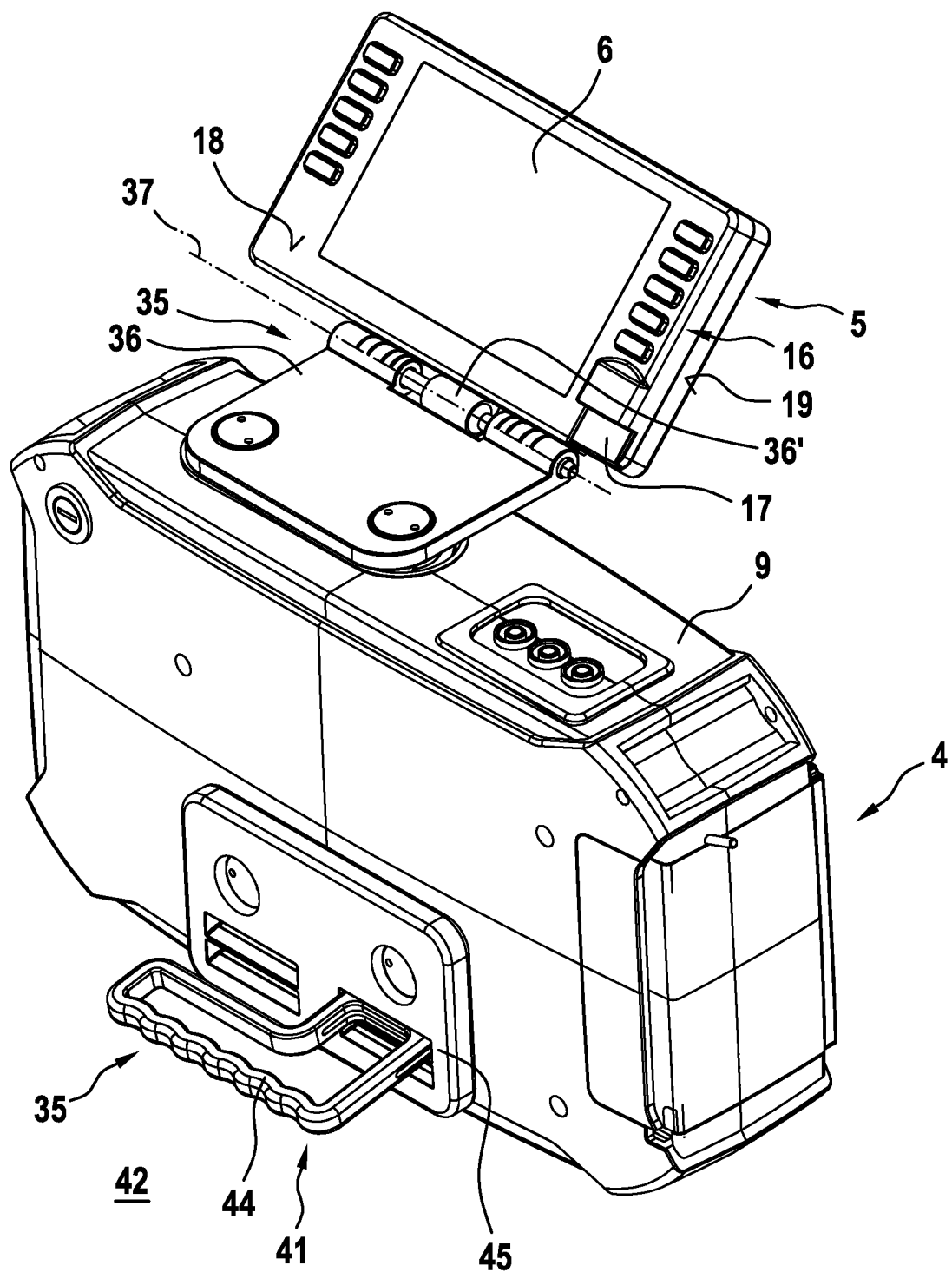
FIG. 4 is a schematic perspective view of a measuring unit supported with respect to an installation surface via an installation unit or via a stand unit, according to an embodiment.
Figure 5:
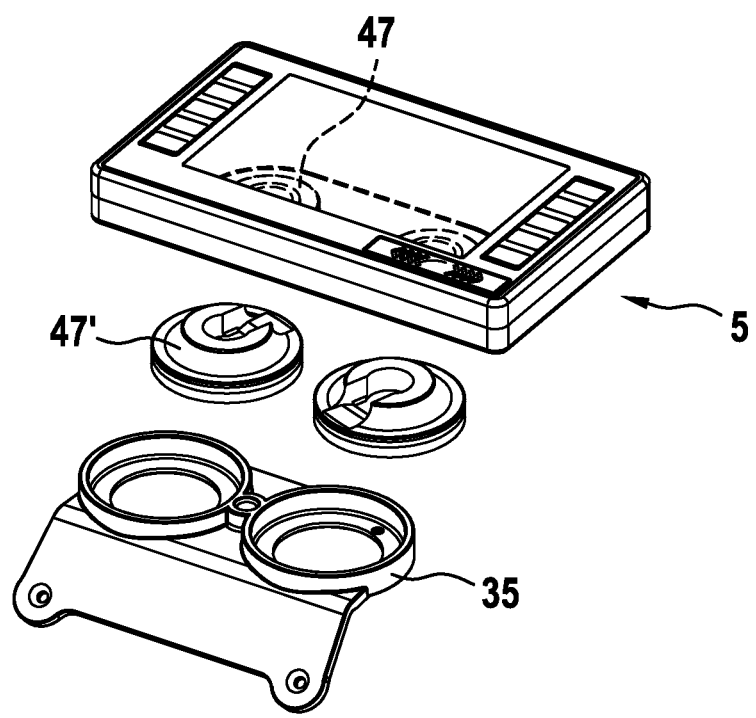
FIG. 5 is a schematic perspective partially disassembled view of an adapter for the output unit according to an embodiment.
Figure 6:
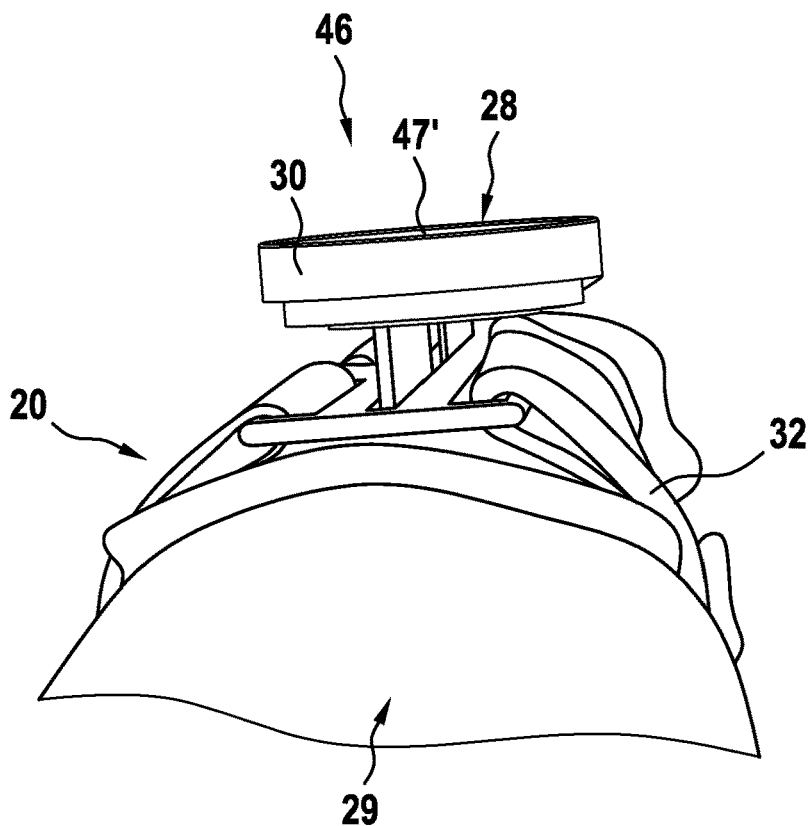
FIG. 6 is a schematic perspective view of a carrying means carried on an arm, according to an embodiment, from a viewing direction extending substantially along the longitudinal axis of the arm.
Figure 7:
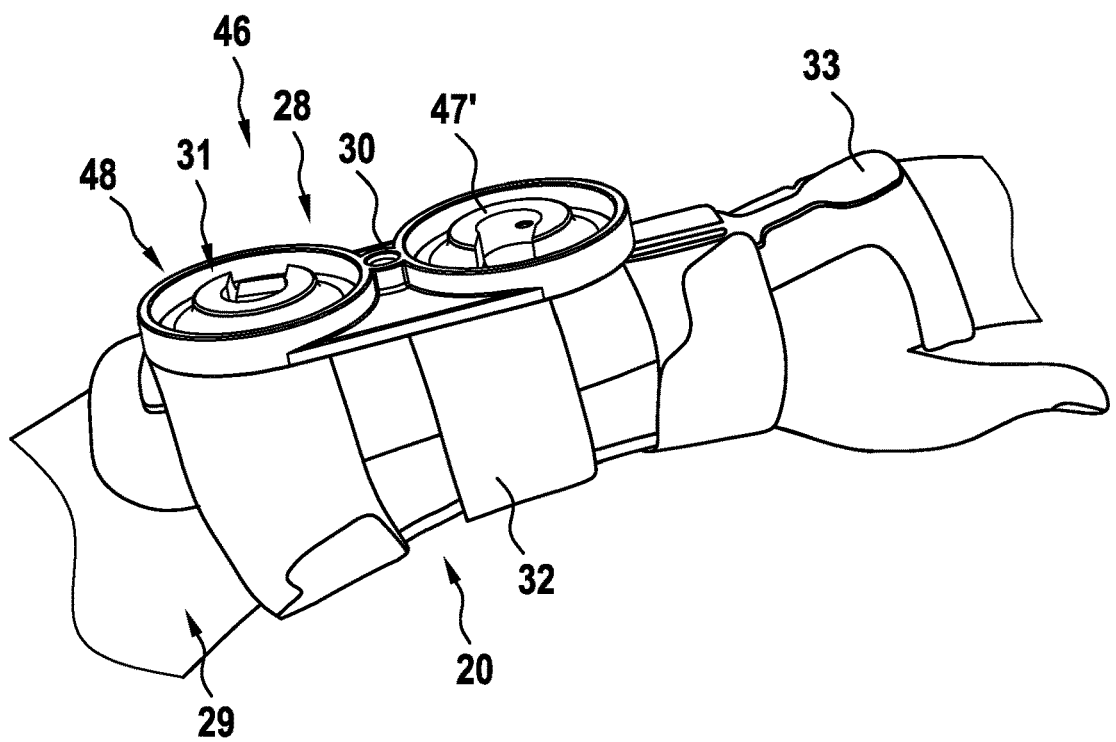
FIG. 7 is a schematic perspective view of the carrying means according to FIG. 6, from a viewing direction directed onto the arm, substantially perpendicularly to the longitudinal axis of the arm.
Figure 8:
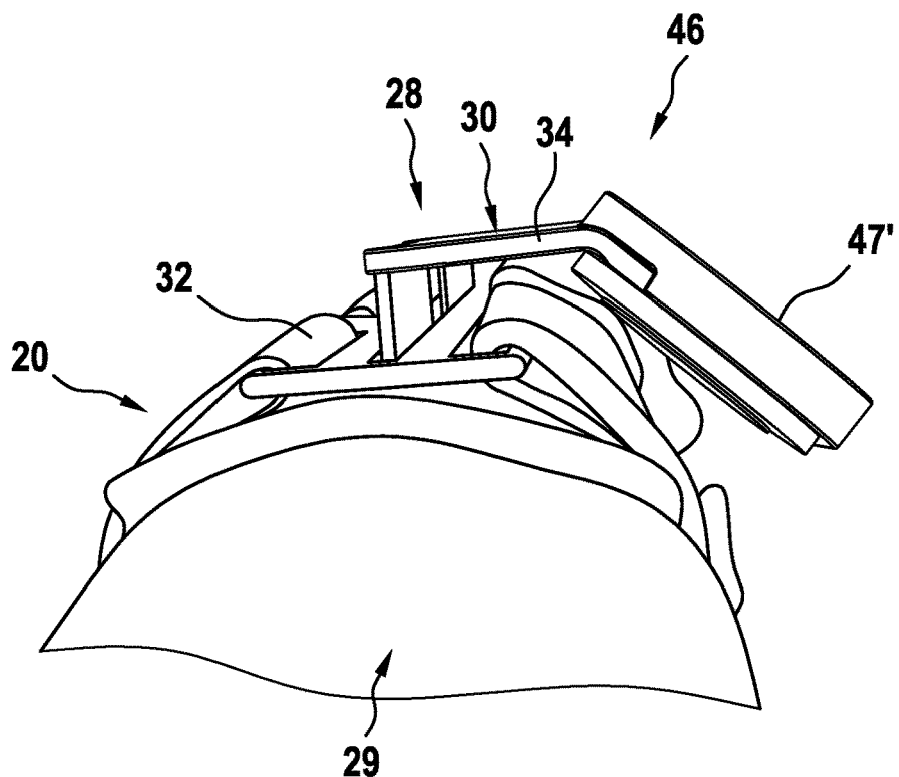
FIG. 8 is a schematic perspective view of a carrying means carried on an arm, according to an alternative embodiment, from a viewing direction extending substantially along the longitudinal axis of the arm.
Figure 9:
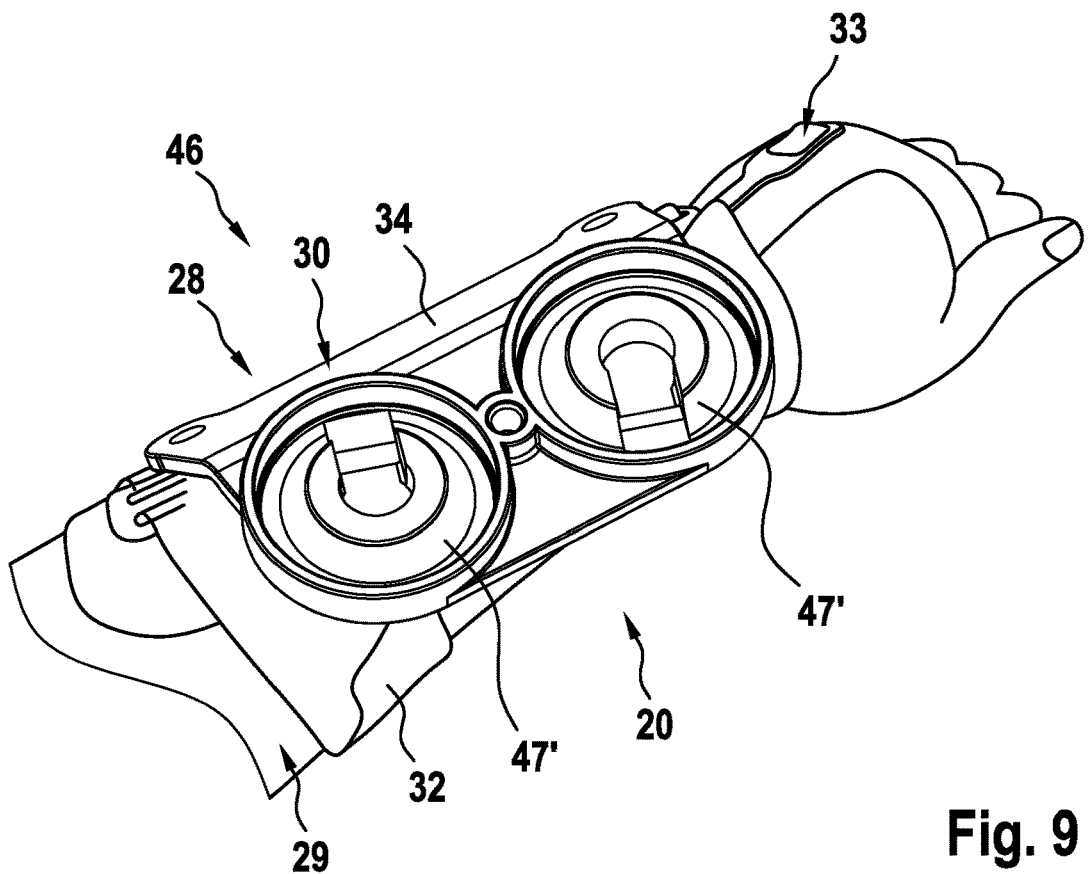
FIG. 9 is a schematic perspective view of the carrying means according to FIG. 8, from a viewing direction directed onto the arm, substantially perpendicularly to the longitudinal axis of the arm.

Different embodiments of an adapter means 35 are shown in FIGS. 2 to 4, wherein the adapter means 35 can be or are connected (a) to the output unit 5 and the measuring unit 4 or between said units, and/or (b) to the output unit 5 and a carrying means 28 or therebetween. In this case, the adapter means 35 is designed for example such that a relative position and/or orientation of (a) the output unit 5 and measuring unit 4, or (b) of the output unit 5 and carrying means 28, or (c) of the measuring unit 4 and installation surface 42, relative to one another, can be changed using the adapter means 35. For this purpose, the adapter means 35 can comprise at least two adapter elements 36, 36' which are mounted so as to be rotationally and/or translationally movable relative to one another, wherein a measuring unit 4 and/or a carrying means 28 can be or is connected to a first adapter element 36, and an output unit 5 can be or is connected to a further adapter element 36'. A swivel axis 37 of an adapter means 35 can preferably be designed or arranged such that, in the assembled state of the adapter means 35 and the output unit 5, and/or of the adapter means 35 and the measuring unit 4, the swivel axis 37 of the adapter means 35 is oriented in parallel with an outside edge of the measuring unit 4 and/or of the output unit 5.

In a preferred embodiment, at least one relative position and/or orientation (a) of the output unit 5 and measuring unit 4, and/or (b) of the output unit 5 and carrying means 28, relative to one another, can be locked, in particular using the adapter means 35. For this purpose, for example an at least temporary release of the locking can be carried out by actuating a mechanism (not shown), in order to achieve a locked state again after the actuation has ended.

A change in the relative position and/or orientation (a) of the output unit 5 and measuring unit 4, and/or (b) of the output unit 5 and carrying means 28, in particular via the adapter means 35, can for example be designed so as to latch in at least one predefined relative position and/or orientation. In other words, at least one latching means (not shown) can be provided, which specifies a latching movement of the measuring unit 4 and output unit 5, or of the output unit 5 and carrying means 28.

The output unit 5 and/or the measuring unit 4 can comprise for example at least one detachable electrical energy store 7, 8 for supplying energy to the output unit 5 and/or the measuring unit 4. In the state when detached from the output unit 5 and/or from the measuring unit 4, said electrical energy store 7, 8 can be connectable or fastenable to a carrying device 21 and/or to a carrying means 28 and/or to a belt holding means 38, via a connection interface, e.g. by means of a connecting means 47, 47'.

For example an electrical accumulator (not shown) can be arranged or formed in or on the carrying device 21 and/or in or on the carrying means 28, wherein, in the state when connected to the carrying device 21 and/or in the state when connected to the carrying means 28 (a) the measuring unit 4 and/or (b) the output unit 5 and/or (c) an electrical energy store 7, 8 detached from the measuring unit 4 and/or from the output unit 5, an electrical energy store 7 of the measuring unit 4 and/or an electrical energy store 8 of the output unit 5 and/or the electrical energy store 7, 8 detached from the measuring unit 4 and/or from the output unit 5 can be chargeable.

Figure 10:
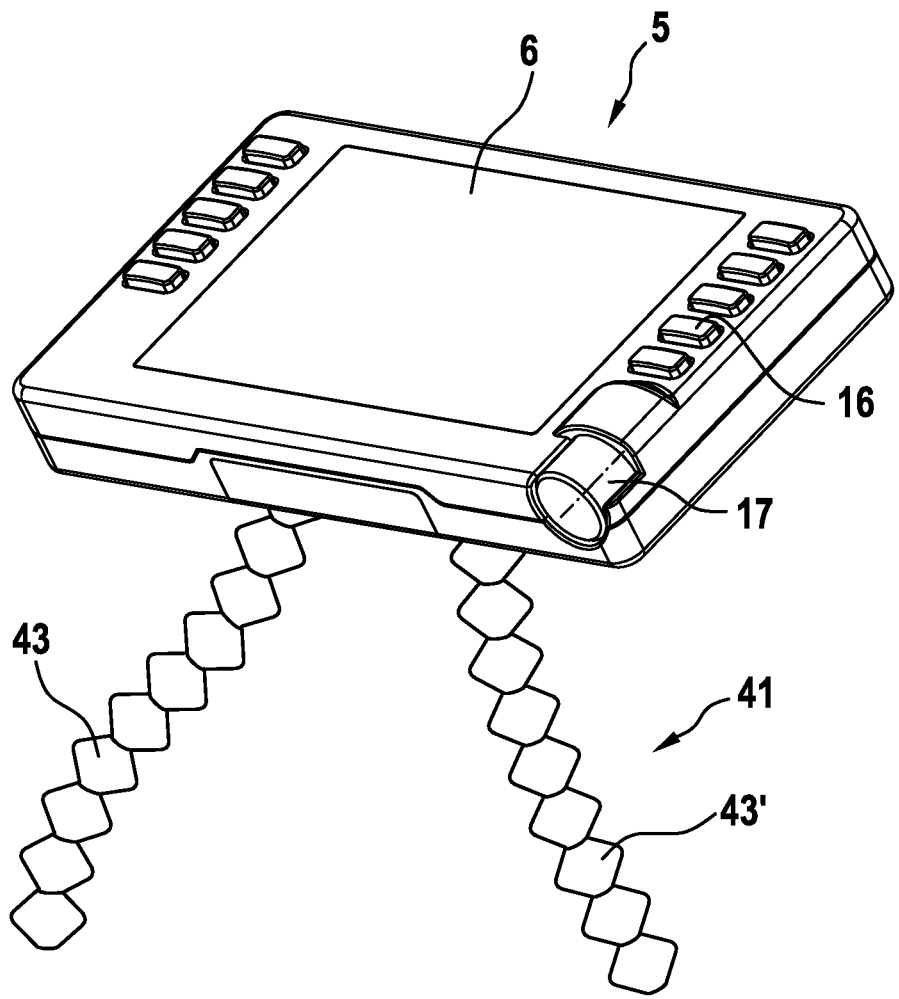
FIG. 10 is a schematic perspective view of an output unit supported on an installation surface via a stand unit, according to an embodiment.

The measuring instrument assembly 1 can for example comprise a stand unit 41, wherein an output unit 5 and/or a measuring unit 4 can be or is connected to the stand unit 41, wherein the stand unit 41 is designed such that purposeful orientation and/or positioning of the output unit 5 and/or measuring unit 4 connected to the stand unit 41, relative to an installation surface 42 of the stand unit 41, can be carried out. For example, the stand unit 41 can comprise at least one, in particular at least two, installation feet 43, 43', which feet are of variable shape and/or length, in particular bendable, cf. FIG. 10. The stand unit 41 can also be used for supporting the measuring unit 4 relative to an installation surface 42, cf. FIG. 4. In this case, the stand unit 41 can comprise a placement bracket 44, the position and/or orientation of which, relative to a stand base body 45, can be changed, in particular the stand base body 45 can be shifted, in particular locked and/or plugged, into predefined positions and/or orientations relative to the placement bracket 44. The stand main body 45 can for example be connected to the measuring unit 4 via a connection interface, in particular via a connecting means 35.

At least parts of the measuring instrument assembly 1 can be connectable to one another via force-fitting and/or form-fitting connecting means 47. In particular (a) the output unit 5 and the measuring unit 4, and/or (b) the output unit 5 and a functional unit 46, and/or the measuring unit 4 and a functional unit 46, are or can be interconnected in a force-fitting and/or form-fitting manner, via corresponding connecting means 47. The functional unit 46 preferably comprises an electrical energy store 7, 8 and/or a carrying device 21 and/or a carrying means 28 and/or an adapter means 35 and/or a belt holding means 38 and/or a testing instrument 14 and/or a stand unit 41. A connecting means 47 comprising at least one force-fitting connection can comprise at least one frictional connection portion and/or at least one field connection portion (magnetic field forces).

Figure 19:
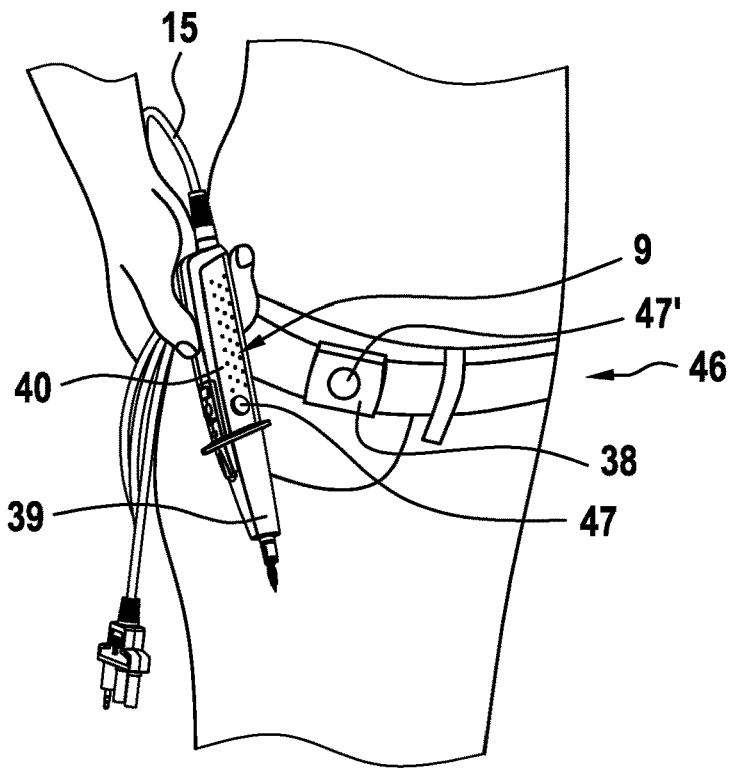
FIG. 19 is a schematic perspective view of a testing instrument in a state detached from a belt holding means, according to an embodiment.
Figure 20:
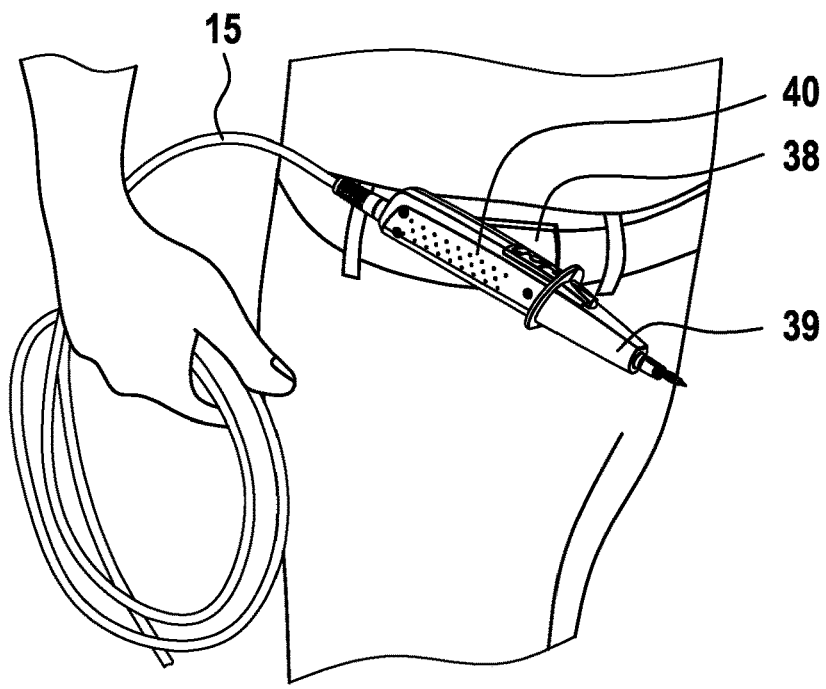
FIG. 20 is a schematic perspective view of a testing instrument according to FIG. 19 in a state connected to the belt holding means.

The measuring instrument assembly 1 can comprise a testing instrument 14 which comprises a test tip 39 and a testing instrument main body 40, wherein selectively different test tips 39 can be connected to at least one testing instrument main body 40, cf. FIGS. 19 and 20. At least one, in particular all, test tips 39 and/or testing instrument main bodies 40 can be able to be fastened via connecting means 47 to a belt holding means 38 and/or to other functional units 46 via corresponding connecting means 47.

The output unit 5, the measuring unit 4 and at least one functional unit 46 can for example comprise a connecting means 47 of the same type, which can be or is connected to corresponding connecting means 47 of a further functional unit 46, in particular a functional unit 46 designed as an electrical energy store 7, 8 and/or carrying device 21 and/or carrying means 28 and/or adapter means 35 and/or belt holding means 38 and/or testing instrument 14 and/or stand unit 41 and/or receiving body 50.

For example a first connecting means 47 can be arranged or formed on the output unit 5, and a further connecting means 47', which is different from the first connecting means 47 and can be connected to the first connecting means 47, can be arranged or formed on the measuring unit 4 and/or on an adapter means 35, wherein at least one first functional unit 46 comprises a first connecting means 47, and at least one further functional unit 46, which is different from the first functional unit 46, comprises a further connecting means 47'. Thus, as a result of for example non-compatibility of the first connecting means 47 with one another, and the non-compatibility of the second connecting means 47' with one another, but the compatibility of a first connecting means 47 with a second connecting means 47', a purposeful combinability of the measuring unit 4, the output unit 5, and defined functional units 46, can be specified, in particular by the manufacturer. This can simplify the handling, in particular an autodidactic use or connection of the individual elements of the measuring instrument assembly 1 described herein. Two interconnectable connecting means 47, 47' can for example form a twist-proof connection in the connected state.

The adapter means 35 can for example comprise first connecting means 47 and second connecting means 47' which can be connected to the first connecting means 47, such that all the functional units 46 can be connected to the adapter means 35.

The connecting means 47, 47' can be designed as a connecting means 47, 47' that is consistent or of the same type over a plurality of units of the measuring instrument assembly; in the embodiment shown, the connecting means 47, 47' is designed as closure means of the SNAP series by the company Fidlock GmbH (Germany).

The measuring instrument assembly 1 described herein comprises a measuring instrument apparatus 2, wherein the measuring instrument apparatus 2 comprises a measuring unit 4 and an output unit 5 which can be detachably connected to the measuring unit 4. In addition to the measuring unit 4 and an output unit 5, the measuring instrument assembly 1 can comprise at least one functional unit 46. In this case, the functional unit 46 can for example comprise a carrier unit 21 and/or a carrying means 28 and/or an electrical energy store 7, 8 and/or a testing instrument 14 and/or an adapter means 35 and/or a belt holding means 38 and/or receiving body 50.

Figure 21:
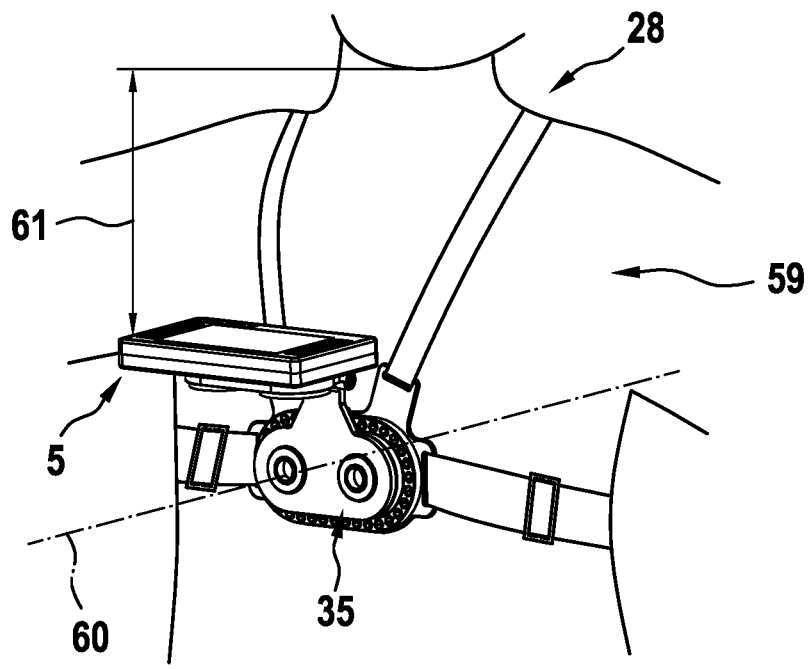
FIG. 21 is a schematic perspective view of a carrying means carried on an upper body, wherein the output unit is arranged in a first position, according to an embodiment.
Figure 22:
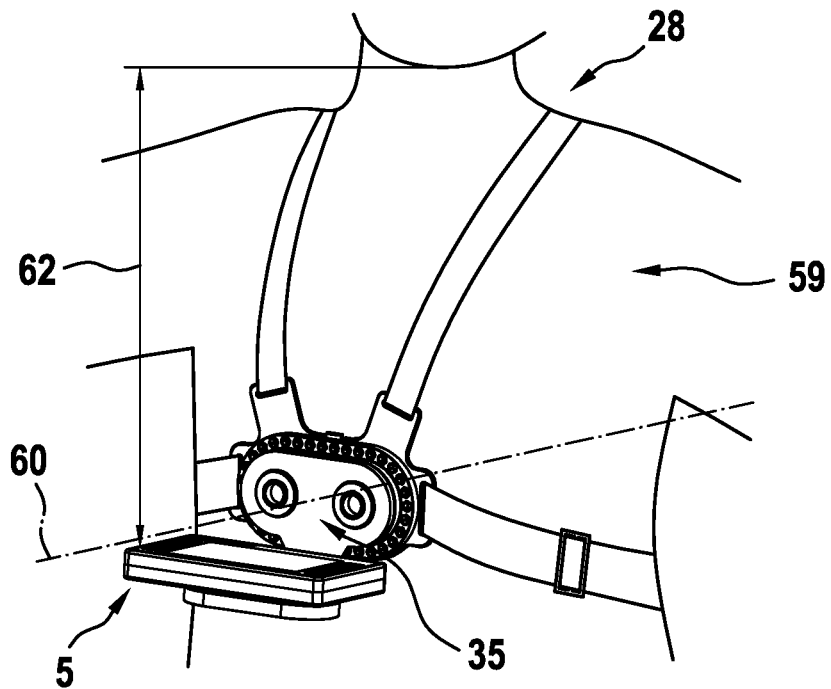
FIG. 22 is a schematic perspective view of a carrying means carried on an upper body, wherein the output unit is arranged in a further position, according to an embodiment.

FIGS. 21 and 22 show a carrying means 28 carried on the torso of a person. An output unit 5 is fastened to said carrying means 28 via an adapter means 35. According to FIG. 21, the output unit 5 is arranged or formed at a first distance 61 from the head of the person, and according to FIG. 22 at a second distance 62 from the head of the person, which is larger compared with the first distance 61. This is achieved, by way of example, in the present case, in that an L-shaped adapter means 35 is rotated, at least temporarily, or permanently, about the axis 60 (for example an axis 60 extending in parallel with the viewing direction of the person carrying the carrying device) (in this case, by way of example: rotated about 180°). It can also be provided for the output unit 5, the carrying means 28 and/or the adapter means 35 to comprise translationally and/or rotationally movable elements, which allows for a straight and/or rotating relative movement between the carrying means 28 and the output unit 5, in order to change the distance 61, 62 and/or the orientation (angular position) of the carrying means 28 relative to the head of the person.

In the overview of FIGS. 21 and 22 it can be seen that the adapter means 35 can be fastened to the carrying means 28 in at least two different orientations. Alternatively or in addition, it can be provided for the output unit 5 to be able to be fastened to the adapter means 35 in at least two orientations.

Figure 23:
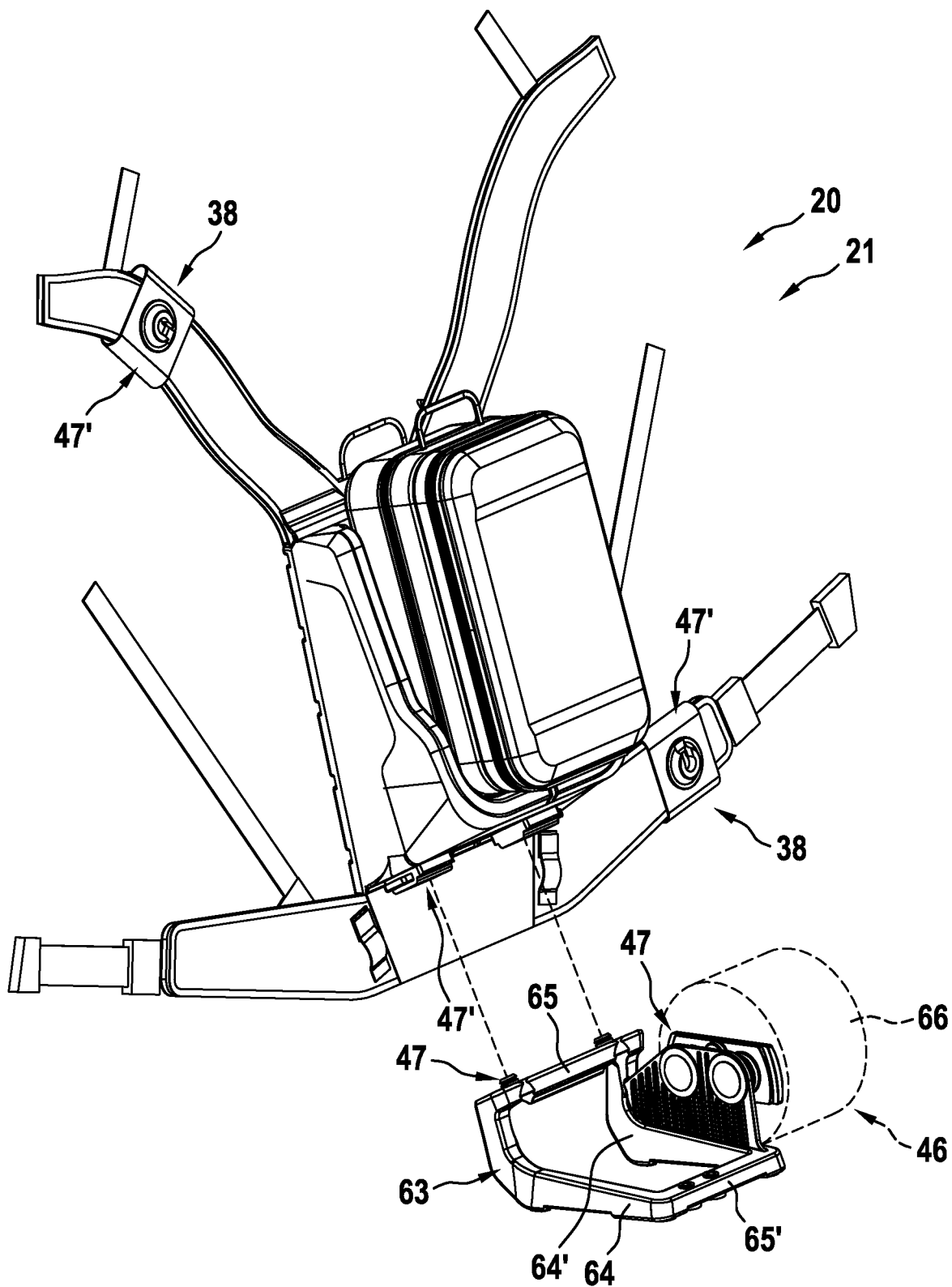
FIG. 23 is a schematic perspective view of a support means provided with a conductor means, according to an embodiment.

According to FIG. 23, a support means 63 can be provided, which, in a state in which the carrying means 28 and/or the carrying device 21 (e.g. rucksack) is deposited on the ground, allows said carrying means 28 or the carrying device 21 sure footing. It is possible to detachably connect the support means 63 to the carrying means 28 and/or to the carrying device 21. The support means 63 is preferably detachably connected to corresponding connection interfaces of the carrying means 28 and/or of the carrying device 21 via mechanical connecting means 47, 47'. The connecting means 47, 47' of the support means 63 are particularly preferably designed in the same way as the connecting means 47, 47' for mechanical connection to the measuring unit 4 and the output unit 5.

The support means 63 can for example be of a frame-like shape, in particular in the shape of a closed frame or a closed ring. The support means 63 can preferably be substantially in the shape of a ring-like body, which extends, at least in portions, out of a main extension plane.

It is thus possible for the support means 63 to comprise two side elements 64, 64' and two connecting elements 65, 65', wherein the side and connecting elements 64, 64', 65, 65' form a closed ring. The side elements 64, 64' can be for example L-shaped, wherein a first connecting element 65 is arranged or formed on a first limb of the L-shape of the at least one side element 64, 64', and a further connecting element 65' is arranged or formed on the second limb of the L-shape of the at least one side element 64, 64'. In particular, the side elements 64, 64' can be oriented in parallel with one another and/or the connecting element 65, 65' can be oriented in parallel with one another.

For example, a functional unit 46 can be fastened to the support means 63, preferably via corresponding connecting means 47, 47'. In the embodiment shown in FIG. 23, a functional unit 46 designed as a conductor means holder 66 is detachably fastened to the support means 63. In other words, the conductor means holder 66 can carry a conductor means (e.g. cable) and thus form a cable drum. For this purpose, the support means 63 can comprise a fastening region on a side and/or connecting element 64, 64', 65, 65', on which fastening region corresponding connecting means 47, 47' are arranged or formed, in order to establish a detachable fastening to a functional unit 46. In addition to the lateral arrangement, which is shown, of the functional unit 46, in particular the conductor means holder 66, this can also optionally take place centrally below the measuring unit 4 carried via the carrying means 21.

It may for example prove advantageous for the support means 63 to carry or be designed as a functional unit 46, in particular a conductor means holder 66, in such a way that, in a state when placed on the ground, in a manner as intended, the functional unit 46, in particular the conductor means holder 66, does not touch the ground. In the case of a functional unit 46 designed as a cable drum, this makes it possible to allow for unwinding of the cable from the cable drum, without there being a resistance on account of possible contact of the cable drum with the ground.

According to FIG. 23, at least one belt holding means 38 for modular, in particular selective, fastening of at least one functional unit 46 and/or a measuring unit 4 and/or an output unit 5 can be arranged on at least one belt of the carrier unit 20, in particular of the carrying device 21.

By way of the connecting means 47, 47', the present measuring instrument assembly 1 has a modular structure with regard to the connectability of the measuring unit to the output unit and optionally to further functional units 46. For example, the table shown in FIG. 24 gives an overview of the connection options, by way of example, which result on account of corresponding connecting means 47, 47' which are provided or formed or arranged on the respective units 4, 5, 46.

The tables shown in FIGS. 24 and 25 show the combinability with regard to the connectability of the individual units 4, 5, 46. In this respect, the rows and columns are determined as follows: ME corresponds to the measuring unit 4; AE corresponds to the output unit 5; FE1 corresponds to the adapter means 35; FE2 corresponds to the testing instrument 14; FE3 corresponds to the handle; FE4 corresponds to the carrying device 21, in particular carrying system 24; FE5 corresponds to a carrying unit 20 designed as a receiving body 50, in particular as a bag or rucksack; FE6 corresponds to a carrying device 21 designed as a waistcoat; FE7 corresponds to a carrying device 21 carried on the torso of a person; FE7 corresponds to a support means 63; FE8 corresponds to a conductor retaining means 66.

In an alternative embodiment, by way of example, the measuring unit 4, the output unit 5 and/or at least some of the functional units 46 can be designed having connecting means 47, 47' of the same type, such that there is a defined combinability or connectability among the units 4, 5, 46. For this purpose, the connecting means 47, 47' can be designed in the manner of a plug/socket connection, which fits together only a connection of two different connecting means 47, 47' (female/male connector type). It can thus be made possible to purposely prevent certain connection combinations of the units 5, 6, 46, by means of the provision of the respective types of connecting means 47, 47'.

In this case, the table shown in FIG. 25 is to be understood such that the associations of units 4, 5, 46 denoted by "X" cannot be directly interconnected, on account of the connecting means 47, 47' provided on the respective units 4, 5, 46. In this case, a first embodiment can exhibit exclusively a connectability or non-connectability of one row of the table, and thus of one unit 4, 5, 46 with respect to the remaining units 4, 5, 46. In a second embodiment, the combinability according to at least, in particular exclusively, one row of the table can be provided. In a third embodiment, the connectability according to at least one column of the table can be provided. In a fourth embodiment, a connectability of all the rows can be provided. FIG. 25 is intended, overall, to show the optional possibility of the design of the measuring instrument assembly, in such a way that it is possible to purposely specify the combinations of the units 4, 5, 46 by means of the connecting means 47, 47'.

LIST OF REFERENCE SIGNS 1 measuring instrument assembly
2 measuring instrument apparatus
3 measuring electronics
4 measuring unit
5 output unit
6 output means
7 electrical energy store of 4
8 electrical energy store of 5
9 main body of 4
10 securing means
11 plug
12 charging cable
13 testing instrument connection socket
14 testing instrument
15 connection cable
16 input means of 5
17 rotating means
18 main extension surface of 5
19 lateral surface of 5
20 carrier unit
21 carrying device
22 wall portion
23 receiving region
24 carrying system
25 shoulder element of 24
26 hip element of 24
27 hip region
28 carrying means
29 arm region
30 base body
31 closure element
32 strap portion
33 finger portion of 28
34 arm portion of 28
35 adapter means
36, 36' adapter element
37 swivel axis
38 belt holding means
39 test tip
40 testing instrument main body
41 stand unit
42 installation surface
43 installation foot
44 placement bracket
45 stand base body
46 functional unit
47 connecting means
48 opening of 22
49 actuation means
50 receiving body
51 first receiving chamber of 50
52 second receiving chamber of 50
53 partition wall
54 aperture
55 opening region
56 cover wall portion
57 arrow
58 arrow
59 torso
60 axis
61 first distance
62 second distance
63 support means
64, 64' side elements
65, 65' connecting element
66 conductor means holder

The invention claimed is:
1. Measuring instrument assembly, comprising:
a measuring instrument apparatus for measuring electrical measurement variables, wherein the measuring instrument apparatus comprises a measuring unit comprising measuring electronics,
an output unit comprising at least one output means, wherein an item of information generated from the measuring unit or relating to the measuring unit is output via the output unit, wherein the output unit and the measuring unit are configured to be detachably connected with each other, and a functional unit and at least one further functional unit comprising at least one of an electrical energy store, a carrying device, a carrying means, an adapter, a belt holding means, a testing instrument, a stand unit, a conductor means, a central conductor holder, a handle and a support means, wherein the output unit, the measuring unit, the functional unit, and the at least one further functional unit are configured to be interconnected in a force-fitting or form-fitting manner or in both force-fitting and form-fitting manner via corresponding connecting means, wherein the corresponding connecting means on the output unit and the functional unit are configured to be fastened, alternately, to the measuring unit by the same connecting means of the measuring unit, wherein the corresponding connecting means comprises one or more first connecting means and one or more further connecting means, wherein the first connecting means is arranged or formed on the output unit, and the further connecting means is configured to be connected to the first connecting means and arranged or formed on the measuring unit, wherein the at least one further functional unit comprises at least one of the one or more first connecting means, and the at least one further functional unit comprises at least one of the one or more further connecting means.

2. Measuring instrument assembly according to claim 1, wherein the output unit comprises at least one input means, wherein a control signal acting on the measuring unit or an item of information that is configured to be associated with a measured value that is to be determined via the measuring unit or an item of information that modifies a measured value determined via the measuring unit, is configured to be input via the input means.

3. Measuring instrument assembly according to claim 1, wherein the carrying device is configured to be carried by a person, wherein the measuring unit is indirectly or directly connected in or on the carrying device, the carrying device is designed or configured such that the measuring unit is configured to be carried in the region of the back of a person via the carrying device.

4. Measuring instrument assembly according to claim 3, wherein the carrying device comprises a receiving region which is defined at least in portions, by a wall portion and is configured to receive the measuring unit.

5. Measuring instrument assembly according to claim 3, wherein the carrying device comprises a carrying system which comprises at least one shoulder element which rests on at least one shoulder of a person carrying the carrying device.

6. Measuring instrument assembly according to claim 3, further comprising an electrical accumulator arranged or formed in or on the carrying device or in or on the carrying means, wherein the measuring unit, or
the output unit, or
the electrical energy store detached from the measuring unit or the output unit
and connected to the carrying device or to the carrying means, is capable of being charged by the electrical accumulator.

7. Measuring instrument assembly according to claim 1, further comprising at least one receiving body that comprises at least one receiving chamber, wherein the measuring unit is configured to be received in the receiving chamber, the receiving body being configured to be detachably connected in or on the carrying device by means of being received in a receiving region on a carrying device side.

8. Measuring instrument assembly according to claim 7, wherein the measuring unit is received in a first receiving chamber of the receiving body, and the output unit is received in a second receiving chamber of the receiving body, the receiving chamber of the receiving body being configured to be at least temporarily separated from the first receiving chamber by a partition wall, wherein the partition wall comprises an aperture, which forms a connection between the first and the second receiving chamber.

9. Measuring instrument assembly according to claim 1, further comprising an adapter means configured to be connected
to the output unit and the measuring unit, or
to the output unit and the carrying means,
wherein the adapter means is designed such that a relative position or orientation of the output unit and measuring unit, or of the output unit and carrying means, relative to one another, is configured to be changeable using the adapter means.

10. Measuring instrument assembly according to claim 9, wherein the adapter means comprises at least two adapter elements which are mounted so as to be rotationally or translationally movable relative to one another, wherein the output unit is configured to be connected to a first adapter element, and the measuring unit or the carrying means is configured to be connected to a further adapter element.

11. Measuring instrument assembly according to claim 9, wherein at least one relative position or orientation
of the output unit and the measuring unit, or
of the output unit and the carrying means
with respect to one another is configured to be locked via the adapter means.

12. Measuring instrument assembly according to claim 9, wherein a change in the relative position or orientation of the output unit and the measuring unit, or of the output unit and the carrying means via the adapter means is configured to latch in at least one predefined relative position or orientation.

13. Measuring instrument assembly according to claim 1, wherein the output unit or the measuring unit comprises at least one detachable electrical energy store for supplying energy to the output unit or the measuring unit, wherein, in the state when detached from the output unit or from the measuring unit, the electrical energy store is configured to be connected to the carrying device or to the carrying means or to the belt holding means, via a separate connecting means.

14. Measuring instrument assembly according to claim 1, wherein the testing instrument is configured to be operably connected to the measuring unit via a connection cable, the testing instrument comprises a test tip and a testing instrument main body, wherein optionally different test tips are configured to be connected to at least one testing instrument main body.

15. Measuring instrument assembly according to claim 1, further comprising a stand unit with the output unit or the measuring unit configured to be connected to the stand unit, wherein the stand unit is designed for purposeful orientation or positioning of the output unit or measuring unit connected to the stand unit relative to an installation surface of the stand unit.

16. Measuring instrument assembly according to claim 1, wherein the output unit, the measuring unit and the functional unit comprise a connecting means of the same type, which is configured to be connected to corresponding connecting means of a further functional unit, the further functional unit designed as at least one of the electrical energy store, the carrying device, the carrying means, the adapter means, the belt holding means, the testing instrument, the stand unit, or a receiving body.

17. Measuring instrument assembly for use in a measuring instrument apparatus according to claim 1.

18. Measuring instrument assembly, comprising:
a measuring instrument apparatus for measuring electrical measurement variables, wherein the measuring instrument apparatus comprises a measuring unit comprising measuring electronics,
an output unit comprising at least one out output means, wherein an item of information generated from the measuring unit or relating to the measuring unit is output via the output unit, wherein the output unit and the measuring unit are configured to be detachably connected with each other, and
a functional unit comprising at least one of an electrical energy store, carrying device, a carrying means, an adapter, a belt holding means, a testing instrument, a stand unit, a conductor means, a central conductor holder, a handle and a support means,
wherein the output unit, the measuring unit, and the functional unit are configured to be interconnected in a force-fitting or form-fitting manner or in both force-fitting and form-fitting manner via corresponding connecting means,
wherein the corresponding connecting means on the output unit and the functional unit are configured to be fastened, alternately, to the measuring unit by the same connecting means of the measuring unit,
wherein the corresponding connecting means comprises one or more first connecting means and one or more further connecting means, wherein the first connecting means is arranged or formed on the output unit, and the further connecting means is configured to be connected to the first connecting means and arranged or formed on the measuring unit, wherein the functional unit comprises at least one of the one or more first connecting means, wherein the one or more first connecting means comprises a first magnetic polarity and the one or more further connecting means comprises a second magnetic polarity, wherein the first polarity is designed to correspond to or to enter an at least temporary connection of the second magnetic polarity.

* * * * *